(12) United States Patent
Beckman et al.

(10) Patent No.: US 10,370,098 B1
(45) Date of Patent: Aug. 6, 2019

(54) ADJUSTABLE PROPELLER BLADE WITH SOUND FLAPS

(71) Applicant: Amazon Technologies, Inc., Seattle, WA (US)

(72) Inventors: Brian C. Beckman, Newcastle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 509 days.

(21) Appl. No.: 14/975,308

(22) Filed: Dec. 18, 2015

(51) Int. Cl.
| | |
|---|---|
| *B64C 27/72* | (2006.01) |
| *B64C 27/57* | (2006.01) |
| *B64C 27/39* | (2006.01) |
| *B64C 11/18* | (2006.01) |
| *B64C 11/20* | (2006.01) |
| *B64C 39/02* | (2006.01) |
| *B64C 27/625* | (2006.01) |

(52) U.S. Cl.
CPC ............. *B64C 27/72* (2013.01); *B64C 11/18* (2013.01); *B64C 11/20* (2013.01); *B64C 27/39* (2013.01); *B64C 27/57* (2013.01); *B64C 27/625* (2013.01); *B64C 39/024* (2013.01); *B64C 2027/7294* (2013.01); *B64C 2201/108* (2013.01); *B64C 2220/00* (2013.01)

(58) Field of Classification Search
CPC .................................................. B64C 2230/14
See application file for complete search history.

(56) References Cited

U.S. PATENT DOCUMENTS

| | | | | |
|---|---|---|---|---|
| 2,957,526 A | * | 10/1960 | Derschmidt | B64C 27/54 416/105 |
| 3,750,982 A | | 8/1973 | Gear | |
| 4,168,939 A | * | 9/1979 | Schmitz | B64C 27/463 415/119 |
| 4,533,297 A | * | 8/1985 | Bassett | F03D 1/0658 416/11 |
| 5,217,349 A | * | 6/1993 | Succi | B64C 5/08 415/119 |
| 5,584,661 A | * | 12/1996 | Brooks | B64C 27/467 416/238 |
| 5,639,215 A | | 6/1997 | Yamakawa et al. | |
| 5,711,651 A | | 1/1998 | Charles et al. | |
| 6,116,857 A | * | 9/2000 | Splettstoesser | B64C 27/467 416/228 |
| 6,168,379 B1 | * | 1/2001 | Bauer | B64C 27/001 244/215 |
| 6,196,796 B1 | * | 3/2001 | Lozyniak | B64C 27/615 416/158 |
| 6,295,006 B1 | * | 9/2001 | Kohlhepp | B64C 27/001 244/17.11 |

(Continued)

*Primary Examiner* — John Olszewski
*Assistant Examiner* — Navid Ziaeianmehdizadeh
(74) *Attorney, Agent, or Firm* — Athorus, PLLC

(57) ABSTRACT

Sounds are generated by an aerial vehicle during operation. For example, the motors and propellers of an aerial vehicle generate sounds during operation. Disclosed is an adjustable propeller that may alter shapes during operation or rotation of the propeller such that the sound generated by the rotation of the propeller changes. The propeller may include multiple sections and joints that allow movement of the sections in any direction. Likewise, the propeller may include one or more sound flaps that may be opened or closed to further alter the sound generated as the propeller rotates.

23 Claims, 17 Drawing Sheets

(56) References Cited

U.S. PATENT DOCUMENTS

| | | | | |
|---|---|---|---|---|
| 6,354,536 B1* | 3/2002 | Torok | B64C 27/605 | 244/39 |
| 6,454,207 B1* | 9/2002 | Yamakawa | B64C 27/615 | 244/99.11 |
| 6,474,945 B1* | 11/2002 | Nakasato | B64C 27/615 | 29/889.7 |
| 6,481,964 B2 | 11/2002 | Lorkowski | B64C 27/473 | 416/23 |
| 6,493,689 B2* | 12/2002 | Kotoulas | F16F 15/02 | 706/23 |
| 6,497,385 B1 | 12/2002 | Wachspress et al. | | |
| 6,530,542 B2* | 3/2003 | Toulmay | B64C 27/001 | 244/17.13 |
| 6,671,590 B1* | 12/2003 | Betzina | B64C 27/001 | 415/119 |
| 6,974,307 B2* | 12/2005 | Antoune | F03D 7/0208 | 416/132 B |
| 7,281,900 B2 | 10/2007 | Zientek | | |
| 7,540,716 B2* | 6/2009 | Wobben | F03D 1/0633 | 416/228 |
| 7,821,148 B2* | 10/2010 | Piasecki | F03D 1/0658 | 290/44 |
| 7,861,967 B2 | 1/2011 | Karem | | |
| 8,626,359 B2* | 1/2014 | Andrews | B64C 27/72 | 244/17.13 |
| 8,672,631 B2* | 3/2014 | Shi | F03D 1/0633 | 416/132 B |
| 8,753,081 B2* | 6/2014 | Aynsley | F04D 25/088 | 416/236 R |
| 9,038,943 B1* | 5/2015 | Morris | B64C 9/00 | 244/215 |
| 9,103,325 B2* | 8/2015 | Koegler | F03D 1/0633 | |
| 9,120,567 B2* | 9/2015 | Scott | B64C 27/72 | |
| 9,140,126 B2 | 9/2015 | Hins | | |
| 9,442,496 B1* | 9/2016 | Beckman | G10K 11/178 | |
| 9,505,492 B2* | 11/2016 | Scott | B64C 27/325 | |
| 2002/0021964 A1* | 2/2002 | Janker | B64C 27/615 | 416/9 |
| 2005/0001104 A1* | 1/2005 | Arnaud | B64C 9/02 | 244/215 |
| 2005/0123400 A1* | 6/2005 | Bagai | B64C 9/10 | 416/1 |
| 2007/0131820 A1* | 6/2007 | Chaudhry | B64C 27/001 | 244/17.25 |
| 2008/0101931 A1* | 5/2008 | Chaudhry | B64C 27/615 | 416/131 |
| 2008/0145220 A1* | 6/2008 | Yeh | B64C 27/615 | 416/23 |
| 2008/0237395 A1* | 10/2008 | Tanabe | B64C 27/001 | 244/1 N |
| 2008/0302914 A1* | 12/2008 | Wagner | B64C 9/16 | 244/131 |
| 2010/0178167 A1* | 7/2010 | Janker | B64C 27/615 | 416/1 |
| 2011/0142642 A1 | 6/2011 | McGrath et al. | | |
| 2011/0164976 A1* | 7/2011 | Matalanis | B64C 27/615 | 416/1 |
| 2011/0223033 A1* | 9/2011 | Wang | F03D 1/0608 | 416/235 |
| 2011/0236208 A1* | 9/2011 | Hirsch | B64C 27/46 | 416/23 |
| 2012/0070288 A1* | 3/2012 | Hofinger | B64C 27/72 | 416/131 |
| 2012/0217754 A1 | 8/2012 | Fukami | | |
| 2013/0119187 A1* | 5/2013 | Germanetti | F01D 7/00 | 244/17.25 |
| 2014/0079234 A1 | 3/2014 | Butts et al. | | |
| 2015/0100221 A1 | 4/2015 | Routledge et al. | | |
| 2015/0158580 A1* | 6/2015 | Kelaidis | B64C 13/16 | 244/1 N |
| 2015/0360773 A1 | 12/2015 | Allen | | |
| 2016/0075430 A1 | 3/2016 | Foskey et al. | | |
| 2016/0083073 A1* | 3/2016 | Beckman | G09F 9/33 | 40/463 |
| 2016/0176506 A1 | 6/2016 | Cross | | |
| 2016/0244148 A1* | 8/2016 | Linch | B64C 11/20 | |
| 2017/0154618 A1* | 6/2017 | Beckman | G10K 11/1788 | |

\* cited by examiner

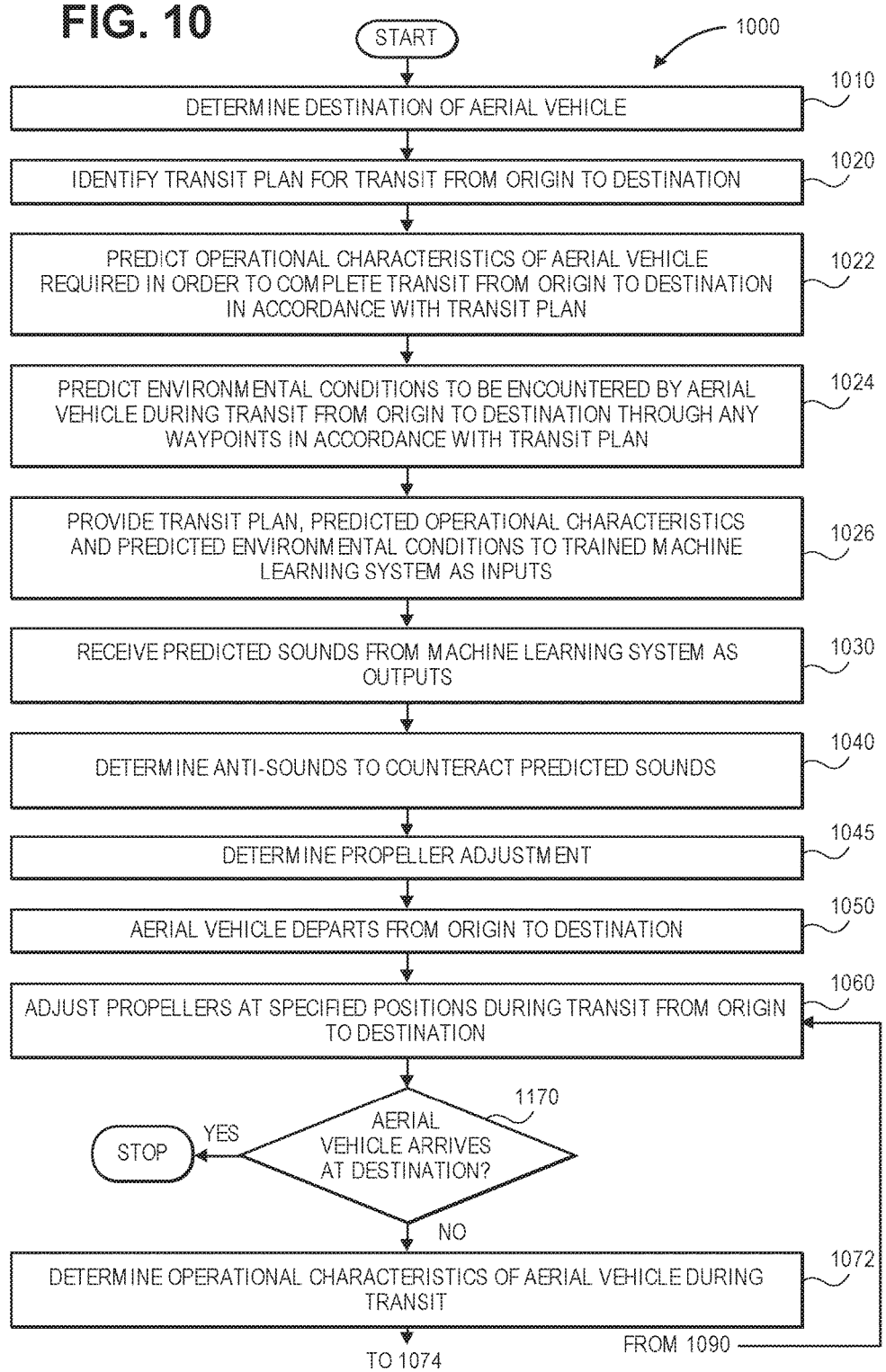

ADJUSTABLE PROPELLER BLADE WITH SOUND FLAPS

BACKGROUND

Vehicle traffic around residential areas continues to increase. Historically, vehicle traffic around homes and neighborhoods was primarily limited to automobile traffic. However, the recent development of aerial vehicles, such as unmanned aerial vehicles, has resulted in a rise of other forms of vehicle traffic. For example, hobbyists may fly unmanned aerial vehicles in and around neighborhoods, often within a few feet of a home. Likewise, there is discussion of electronic-commerce retailers, and other entities, delivering items directly to a user's home using unmanned aerial vehicles. As a result, such vehicles may be invited to navigate into a backyard, near a front porch, balcony, patio, and/or other locations around the residence to complete delivery of packages.

DETAILED DESCRIPTION

Figure 1:
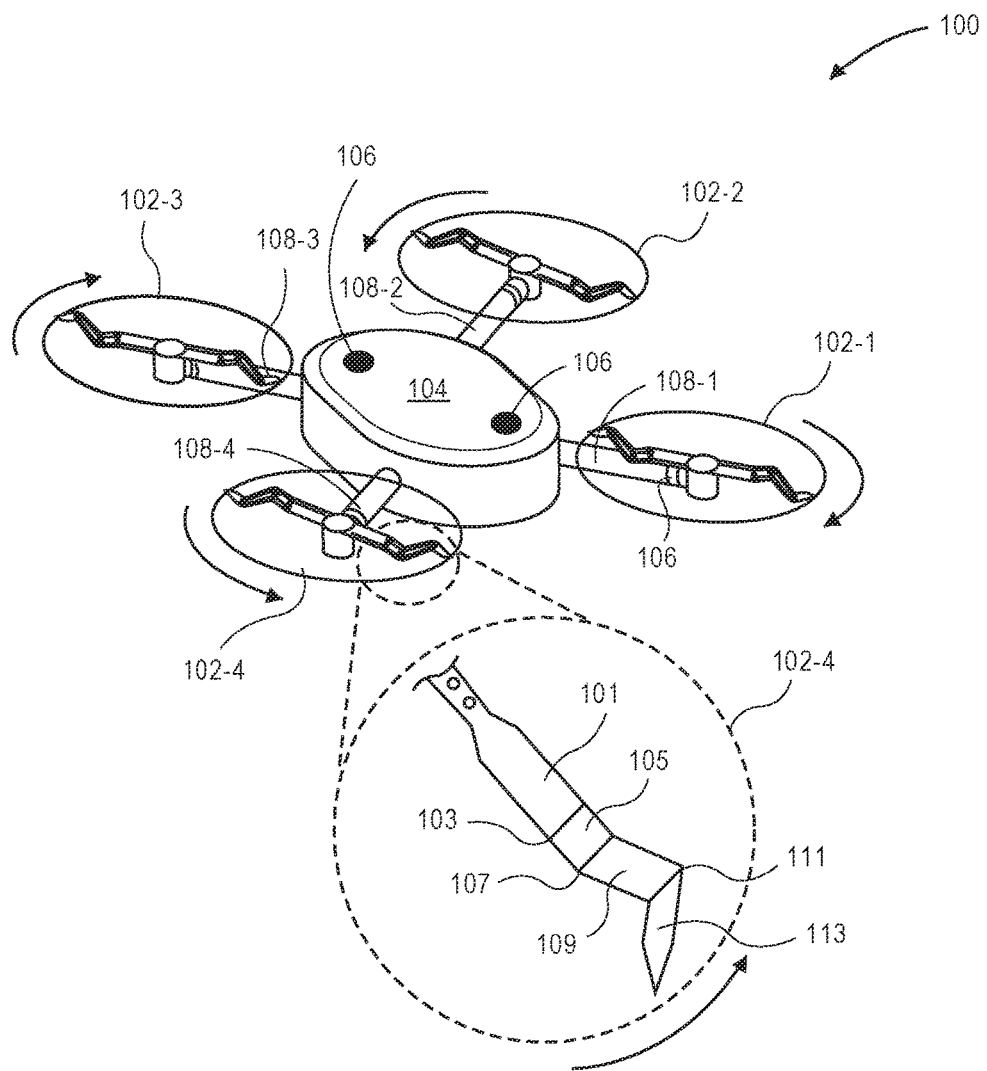
FIG. 1 is a view of an aerial vehicle configured for active sound control, according to an implementation.

The present disclosure is directed to actively controlling and reducing sound generated by an aerial vehicle, such as a UAV, while the aerial vehicle is airborne. For example, one or more propellers of the aerial vehicle may be actively adjustable during operation of the aerial vehicle to alter the sounds generated by the propellers as they rotate and/or to cancel out or reduce other sounds. In one implementation, the propeller blades may have one or more joints that adjust to alter the shape of the propeller blade. The altered shape of the propeller blade causes the propeller to generate different frequencies of sound as it rotates. By altering multiple propeller blades of the aerial vehicle, the different sounds generated by the different propeller blades may effectively cancel, reduce, or otherwise alter the total sound generated by the aerial vehicle, and/or alter the total frequency generated. For example, the different propeller blades may dampen, reduce, and/or otherwise alter the sound by altering the relative and absolute amplitudes of various frequency components of the sound.

In some implementations, the shape of the propeller blades may vary based on the rotational speed of the propeller. In other implementations, one or more sensors may be positioned on the aerial vehicle that measure sound generated by or around the aerial vehicle. Based on the measured sound, the shape of the one or more of the propeller blades may be altered to generate an anti-sound that, when combined with the sound generated by the aerial vehicle, alters the sound generated by the aerial vehicle. For example, a processor of the aerial vehicle may maintain information relating to the different sounds generated by different propeller shapes when the propeller is rotating at different speeds. Based on the measured sound and the desired rotational speed of the propeller, a propeller shape is selected that will generate an anti-sound that will cancel out or reduce the measured sound when the altered shape of the propeller is rotating at the desired rotational speed.

In some implementations, measured sounds may be recorded with other operational and/or environmental data. Such information or data may include, but is not limited to, extrinsic information or data, e.g., information or data not directly relating to the aerial vehicle, or intrinsic information or data, e.g., information or data relating to the aerial vehicle itself. For example, extrinsic information or data may include, but is not limited to, environmental conditions (e.g., temperature, pressure, humidity, wind speed, and wind direction), times of day or days of a week, month or year when an aerial vehicle is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) or tracked positions (e.g., latitudes and/or longitudes) of the aerial vehicles. In accordance with the present disclosure, the amount, the type and the variety of information or data that may be captured regarding the physical or operational environments in which aerial vehicles are operating and correlated with information or data regarding measured sounds is theoretically unbounded.

The extrinsic information or data and/or the intrinsic information or data captured by aerial vehicles during flight may be used to train a machine learning system to associate an aerial vehicle's operations or locations, or conditions in such locations, with sounds generated by the aerial vehicle. The trained machine learning system, or a sound model developed using such a trained machine learned system, may then be used to predict sounds that may be expected when an aerial vehicle operates in a predetermined location, or subject to a predetermined set of conditions, at given velocities or positions, or in accordance with any other characteristics. Once such sounds are predicted, propeller shapes and/or rotational speeds that will result in the propellers generating anti-sounds may be determined. An anti-sound, as used herein, refers to sounds having amplitudes and frequencies that are approximately but not exclusively opposite and/or approximately but not exclusively out-of-phase with predicted or measured sounds (e.g., having polarities that are reversed with respect to polarities of the predicted sounds). During airborne operation of the aerial vehicle, the propellers shape and/or speed may be altered so that the propellers will generate the anti-sound. When the anti-sounds are generated by the propellers, such anti-sounds effectively modify the effects of some or all of the predicted or measured sounds at those locations. In this regard, the systems and methods described herein may be utilized to effectively control, reduce and/or otherwise alter the sounds generated by aerial vehicles during flight.

FIG. 1 is a view of an aerial vehicle 100 configured for active sound control by adjusting the shape and/or rotational speed of one or more propeller blades of the four propellers 102-1, 102-2, 102-3, and 102-4. The propellers 102-1, 102-2, 102-3, and 102-4 are powered by propeller motors and spaced about a body 104 of the aerial vehicle 100 as part of a propulsion system. A control system (not shown), which may be positioned within the body 104 is utilized for controlling the propeller motors for flying the aerial vehicle 100, as well as controlling other operations of the aerial vehicle 100. Each of the propeller motors may be rotated at different speeds, thereby generating different lifting forces by the different propellers 102.

The motors may be of any type and of a size sufficient to rotate the propellers 102 at speeds sufficient to generate enough lift to aerially propel the aerial vehicle 100 and any items engaged by the aerial vehicle 100 so that the aerial vehicle 100 can navigate through the air, for example, to deliver an item to a location. As discussed further below, the outer body or shell of each propeller 102 may be made of one or more suitable materials, such as graphite, carbon fiber, etc. While the example of FIG. 1 includes four motors and propellers, in other implementations, more or fewer motors and/or propellers may be utilized for the propulsion system of the aerial vehicle 100. Likewise, in some implementations, the motors and/or propellers may be positioned at different locations and/or orientations on the aerial vehicle 100. Alternative methods of propulsion may also be utilized in addition to the propellers and propeller motors. For example, engines, fans, jets, turbojets, turbo fans, jet engines, and the like may be used in combination with the propellers and propeller motors to propel the aerial vehicle.

The body 104 or frame of the aerial vehicle 100 may be of any suitable material, such as graphite, carbon fiber, and/or aluminum. In this example, the body 104 of the aerial vehicle 100 includes four motor arms 108-1, 108-2, 108-3, and 108-4 that are coupled to and extend from the body 104 of the aerial vehicle 100. The propellers 102 and corresponding propeller motors are positioned at the ends of each motor arm 108. In some implementations, all of the motor arms 108 may be of approximately the same length while, in other implementations, some or all of the motor arms may be of different lengths. Likewise, the spacing between the two sets of motor arms may be approximately the same or different.

In some implementations, one or more sensors 106 configured to measure sound at the aerial vehicle are included on the aerial vehicle 100. The sensors 106 may be at any location on the aerial vehicle 100. For example, a sensor 106 may be positioned on each motor arm 108 and adjacent to the propeller 102 and/or propeller motor so that different sensors can measure different sounds generated by the different propellers 102. In another example, one or more sensors may be positioned on the body 104 of the aerial vehicle 100. The sensors 106 may be any type of sensors capable of measuring sound and/or sound waves. For example, the sensor may be a microphone, transducer, piezoelectric sensor, an electromagnetic pickup, an accelerometer, an electro-optical sensor, an inertial sensor, etc.

As discussed in further detail below, propeller blades of one or more of the propellers 102 may be adjustable during operation of the aerial vehicle. As the shape of the propeller blade changes, different sounds are generated by the propeller as it rotates. For example, referring to the expanded view of a propeller blade of propeller 102-4, the propeller blade may include two or more sections. In this example, the propeller blade includes a first section 101, a second section 105, a third section 109, and a fourth section 113. The sections are connected with adjustable joints. For example, the first section 101 and the second section 105 are coupled at joint 103. The second section 105 and the third section 109 are coupled at joint 107. The third section 109 and the forth section 113 are coupled at joint 111.

As discussed in more detail below, the different sections of the propeller blades may be adjusted in different directions thereby altering the shape of the propeller blade. In some implementations, the joints may be configured to enable adjustment between sections in any one or more of three different directions. For example, joint 103 may be configured such that the second section 105 may be adjusted in a horizontal (x) direction with respect to the first section 101, a vertical (y) direction with respect to the first section 101, and/or in a rotational (z) with respect to the first section 101.

In some implementations, by measuring sounds at or near each propeller 102 and altering the shape of the blades of each respective propeller 102 to generate anti-sounds, the measured sounds and anti-sounds at each propeller are independent. Accordingly, each sensor and propeller may operate independent of other sensors and propellers on the aerial vehicle and each may include its own processing and/or memory for operation.

Alternatively, one or more sensors 106 positioned on the body 104 of the aerial vehicle may measure generated sounds and a propeller blade adjustment system may send instructions to different propellers to cause the blades of the different propellers to alter shapes, thereby generating different anti-sounds.

While the implementations of the aerial vehicle discussed herein utilize propellers to achieve and maintain flight, in other implementations, the aerial vehicle may be configured in other manners. For example, the aerial vehicle may be a combination of both propellers and fixed wings. In such configurations, the aerial vehicle may utilize one or more propellers to enable takeoff, landing, and anti-sound generation and a fixed wing configuration or a combination wing and propeller configuration tso sustain flight while the aerial vehicle is airborne. In some implementations, one or more of the propulsion mechanisms (e.g., propellers and motors) may have a variable axis such that it can rotate between vertical and horizontal orientations.

Figure 2A:
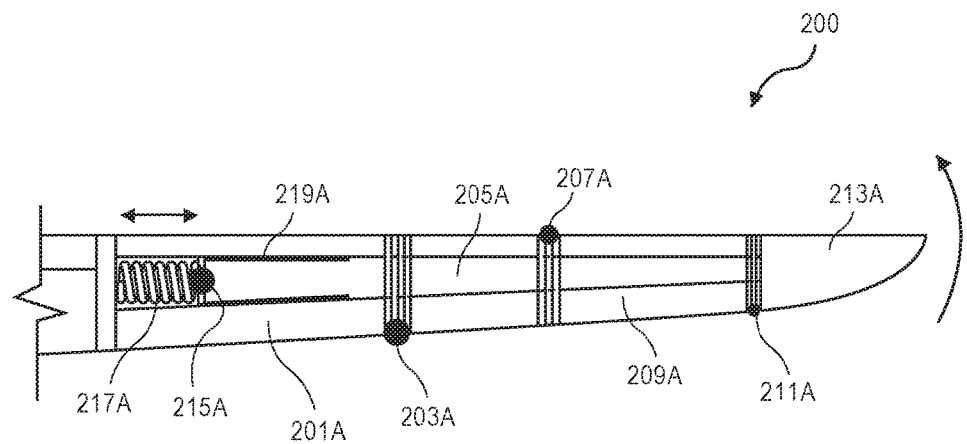
FIGS. 2A-2B is a top-down view of an adjustable propeller blade, according to an implementation.
Figure 2B:
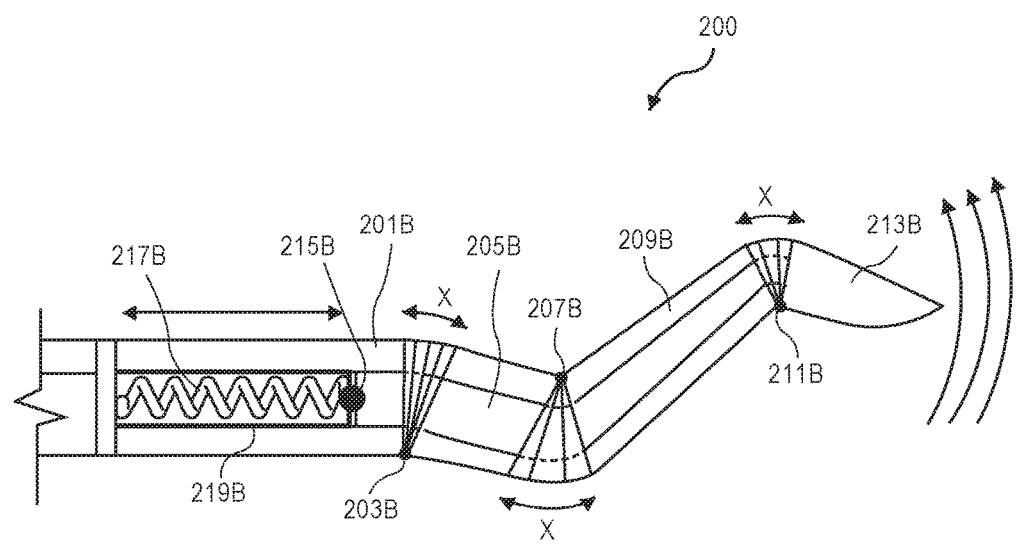
Figure 5:
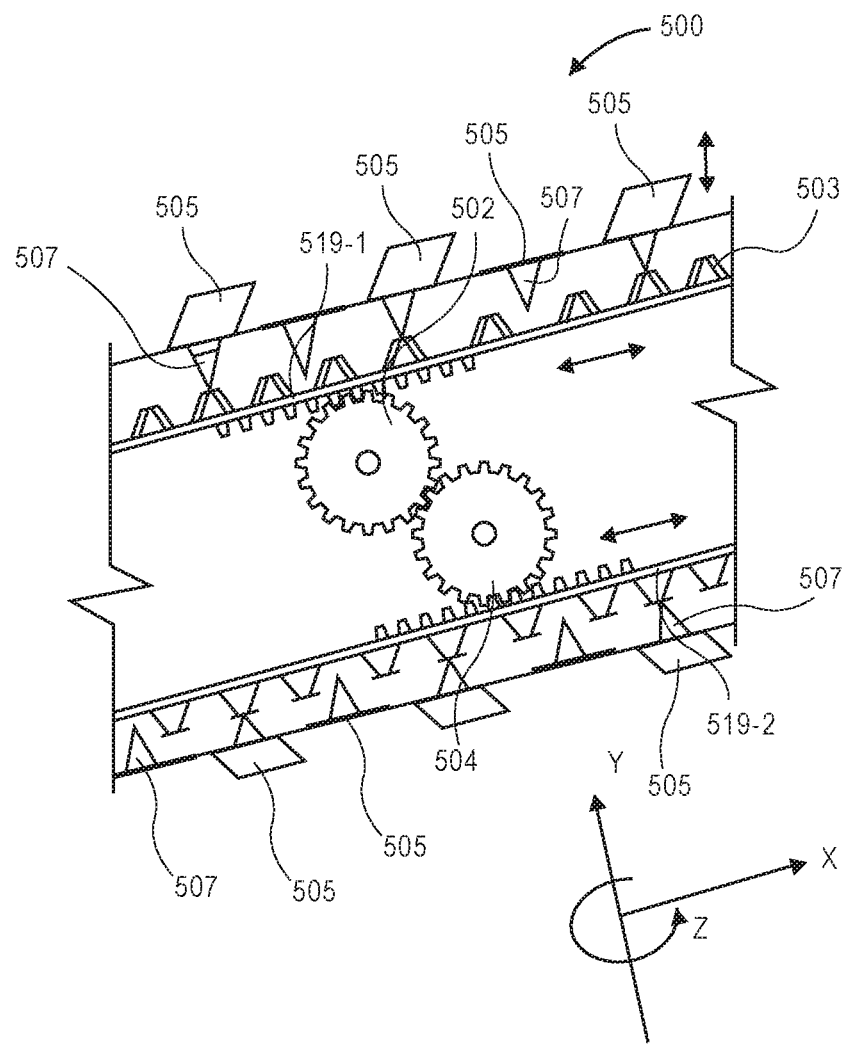
FIG. 5 is a diagram of an adjustment controller for an adjustable propeller blade, according to an implementation.

FIGS. 2A and 2B illustrate a top-down view of an adjustable propeller blade 200, according to an implementation. The propeller blade 200 may be adjusted at the joints 203, 207, 211 to alter the shape of the propeller blade, thereby altering the sound generated by the propeller blade as it rotates. In this example, the propeller blade 200 includes a propeller adjustment controller located within a shell or outer body of the propeller blade. For purposes of illustration, the propeller adjustment controller, which includes a counterweight 215, spring 217, and one or more cables 319, also referred to herein as guide rails, is shown. In other implementations, other configurations may be utilized for the propeller adjustment controller. For example, FIG. 5 illustrates alternative components of the propeller adjustment controller. It will be appreciated that, in some implementations, the propeller adjustment controller may be fully or partially contained within the shell or outer body of the propeller blade and may not be externally visible.

In one implementation, the propeller adjustment controller causes the shape of the propeller blade to alter based on the rotational speed of the propeller blade. For example, referring to FIG. 2A, when the propeller blade is stationary or rotating at a slower speed, the counterweight 215A of the propeller adjustment controller is retracted by a spring 217A toward the hub or base of the propeller blade 200. When the counterweight 215A is retracted, the cables 219A or guide rails are in an extended position, each section 201A, 205A, 209A, and 213A are substantially aligned and the joints 203A, 207A, and 211A are in a neutral or first position such that the propeller blade is substantially straight.

As the rotational speed of the propeller blade increases, as illustrated in FIG. 2B, the counterweight 215B is pulled by centrifugal force away from the base of the propeller blade and the spring 217B extends. As the counterweight 215B extends, the cables 219B are retracted, causing the joints 203B, 207B, and 211B to flex or bend in a horizontal (x) direction, thereby altering the shape of the propeller blade 200. The altered shape of the propeller blade 200 generates a different sound profile, compared to the sound profile generated by the propeller blade when it is straight (FIG. 2A), even when rotating at the same rotational speed. For example, when the propeller blade is in a first shape (e.g., FIG. 2A) the air flowing over the propeller blade as the propeller blade rotates generates a first sound. By altering the shape of the propeller blade (e.g., FIG. 2B), the flow of air over the propeller blade is also altered, thereby generated a different sound.

In this example, the joint 203B causes the second section 205B to move in a first direction with respect to the first section 201B, forming a first angle between the first section 201B and the second section 205B. The joint 207B causes the third section 209B to move in a second horizontal direction that is opposite the first horizontal direction, forming a second angle between the second section 205B and the third section 209B. The joint 211B causes the fourth section 213B to move in the first horizontal direction, forming a third angle between the third section 209B and the fourth section 213B.

The joints may be formed of any material suitable to allow the sections of the propeller blade to be altered or shifted with respect to one another. For example, the joints may be mechanical hinge joints located at the edges of the propeller blade. In other implementations, the joints may be formed of a material that is flexible in a first direction (e.g., horizontally) but not in other directions. In another example, the joints may each be coupled to a series of gears, such as illustrated in FIG. 5, and the cables may be replaced with geared tracks or guides. As the counterweight 215B extends, it moves the geared tracks that causes the gears to turn. As the gears turn, the joints flex, thereby changing the shape of the propeller blade. In still other implementations, the flex or movement of the joints may be actively controlled. In such a configuration, the propeller adjustment controller may control a degree or amount by which each joint is to flex, based at least in part on a rotational speed of the propeller. For example, the gears may be mechanically driven and rotated a specific amount to alter the shape of the propeller blade.

While the illustrated example shows a propeller blade with three joints, each joint moving in an opposite direction to adjacent joints, in other implementations, there may be additional and/or fewer joints and the joints may cause the sections of the propeller to move in the same or different directions. Likewise, the angle between sections generated by the joints may vary between joints and/or some of the joints may have approximately the same angles. In the example illustrated in FIG. 2B, the angle at joint 207B is approximately the same as the angle at joint 211B. In comparison, the angle at joint 203B is approximately one-half of the angle of joint 207B. By altering the angles generated at each joint, the propeller blade may be moved into different positions and shapes.

The example illustrated in FIGS. 2A-2B shows a propeller blade in which the shape of the blade is altered as a function of the rotational speed of the propeller. In other implementations, rather than using a counterweight to alter the shape of the propeller, one or more mechanically controlled gears and/or levers may be used to control the shape of the propeller blade. For example, a sensor may measure sound generated by the aerial vehicle during operation and, based on the measured sound, send instructions to a motor or drive mechanism to rotate the gears, thereby adjusting the shape of the propeller blade so that the propeller blade generates a determined anti-sound when rotating.

As discussed, different shapes of the propeller may generate different sound profiles at different rotational speeds because the airflow over the propeller is altered as the shape changes. Lifting forces generated by the propeller blade may also vary depending on the shape of propeller blade. Likewise, the power required to rotate the propeller to generate a commanded lifting force may also vary depending on the shape of the propeller. For example, if the pitch and/or length of the propeller is altered with the shape, the rotational speed may need to be increased (or decreased) to generate the commanded lifting force. The change in rotational speed may increase (or decrease) the power requirements.

The propeller adjustment controller may consider the lifting force to be generated, the anti-sound to be generated, and the corresponding power requirements to determine a rotational speed and shape of the propeller. For example, a first propeller shape rotating at a first speed may generate a first anti-sound, a first lifting force, and draw a first amount of power. Likewise, a second propeller shape rotating at a second speed may generate a second anti-sound, generate the same lifting force, but draw a different amount of power. Likewise, a third propeller shape rotating at a third speed may generate the first anti-sound, the first lifting force, but draw yet another amount of power. The combination of propeller shapes, rotational speeds, resulting lifting forces, anti-sounds, and power requirements that may be selected for use in aerially navigating the aerial vehicle and generating a desired anti-sound is essentially unbounded.

Figure 3A:
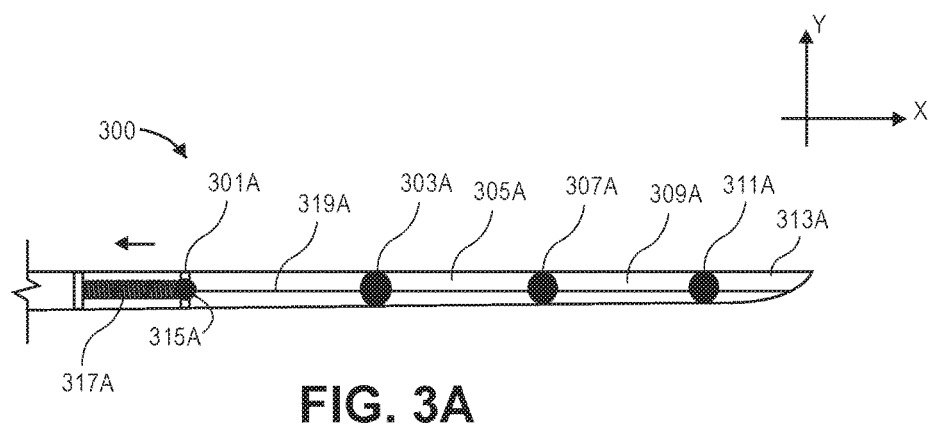
FIGS. 3A-3B is a side-view of an adjustable propeller blade, according to an implementation.
Figure 3B:
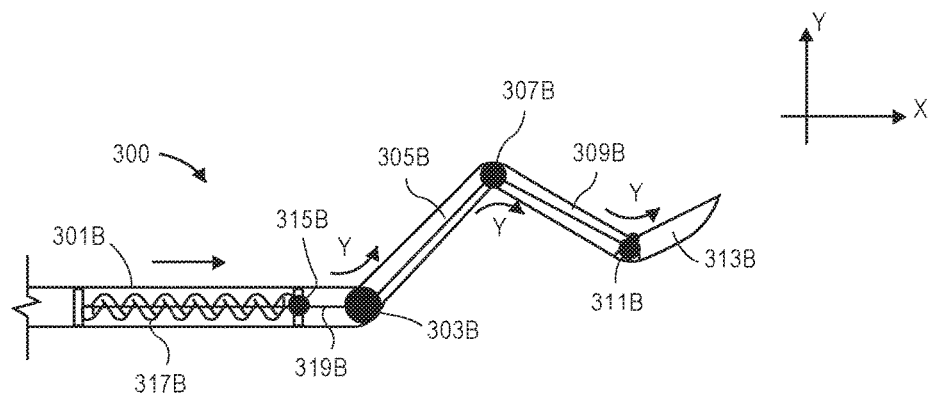

FIGS. 3A and 3B illustrate a side-view of an adjustable propeller blade 300, according to an implementation. The propeller blade 300 may be adjusted at the joints 303, 307, 311 to alter the shape of the propeller blade, thereby altering the sound generated by the propeller blade as it rotates. In this example, the propeller blade 300 includes a propeller adjustment controller located within a shell or outer body of the propeller blade. For purposes of illustration, the propeller adjustment controller, which includes a counterweight 315, spring 317, and one or more cables 319 is shown. It will be appreciated that, in some implementations, the propeller adjustment controller may be fully or partially contained within the shell or outer body of the propeller blade and may not be externally visible.

In one implementation, the propeller adjustment controller causes the shape of the propeller blade to alter based on the rotational speed of the propeller blade. For example, referring to FIG. 3A, when the propeller blade is stationary or rotating at a slower speed, the counterweight 315A of the propeller adjustment controller is retracted by a spring 317A toward the hub or base of the propeller blade 300. When the counterweight 315A is retracted, the cables 319A are in an extended position, each section 301A, 305A, 309A, and 313A are substantially aligned and the joints 303A, 307A, and 311A are in a neutral or first position such that the propeller blade is substantially straight.

As the rotational speed of the propeller blade increases, as illustrated in FIG. 3B, the counterweight 315B is pulled by centrifugal force away from the base of the propeller blade and the spring 317B extends. As the counterweight 315B extends, the cables 319B are retracted, causing the joints 303B, 307B, and 311B to flex or bend in a vertical (y) direction, thereby altering the shape of the propeller blade 300. As discussed above with respect to FIG. 2B, the altered shape of the propeller blade 300 generates a different sound profile compared to the sound profile generated by the propeller blade when it is straight (FIG. 3A).

In this example, the joint 303B causes the second section 305B to move in a first vertical direction with respect to the first section 301B, forming a first angle between the first section 301B and the second section 305B. The joint 307B causes the third section 309B to move in a second vertical direction that is opposite the first vertical direction, forming a second angle between the second section 305B and the third section 309B. The joint 311B causes the fourth section 313B to move in the first vertical direction, forming a third angle between the third section 309B and the fourth section 313B.

The joints may be formed of any material suitable to allow the sections of the propeller blade to be altered or shifted with respect to one another. For example, the joints may be mechanical hinge joints located at the edge of the propeller blade. In other implementations, the joints may be formed of a material that is flexible in a second direction (e.g., vertically) but not in other directions. In still other implementations, the flex or movement of the joints may be controlled by the propeller adjustment controller. In such a configuration, the propeller adjustment controller may control a degree or amount by which each joint is to flex, based at least in part on a rotational speed of the propeller and a desired anti-sound.

While the illustrated example shows a propeller blade with three joints, each joint moving in an opposite direction to adjacent joints, in other implementations, there may be additional and/or fewer joints and the joints may cause the sections of the propeller to move in the same or different directions. Likewise, the angle between sections generated by the joints may vary between joints and/or some of the joints may have approximately the same angles. In the example illustrated in FIG. 3B, the angle of each joint 303B, 307B, and 311B is different, thereby causing the fourth section 313B of the propeller blade to be vertically higher than the first section 301B of the propeller blade when the cables 319B are retracted.

The example illustrated in FIGS. 3A-3B shows a propeller blade in which the shape of the blade is altered as a function of the rotational speed of the propeller. In other implementations, rather than using a counterweight to alter the shape of the propeller, one or more mechanically controlled gears and/or levers may be used to control the shape of the propeller blade. For example, a sensor may measure sound generated by the aerial vehicle during operation and, based on the measured sound, send instructions to a motor or drive mechanism to rotate the gears, thereby adjusting the shape of the propeller blade so that the propeller blade generates a determined anti-sound.

As discussed in further detail below, different shapes of the propeller may generate different sound profiles at different rotational speeds. Likewise, lifting forces generated by the propeller blade may vary depending on the shape of propeller blade. Accordingly, the propeller adjustment controller may consider the lifting force to be generated and the anti-sound to be generated to determine a rotational speed and shape of the propeller.

While FIGS. 2A-2B illustrate altering the shape of the propeller blade in the horizontal (x) direction and FIGS. 3A-3B illustrate altering the shape of the propeller blade in the vertical (y) direction, in some implementations, one or more joints and/or sections of the propeller blade may be altered in both the horizontal and/or vertical direction. Likewise, in some implementations, some joints of the propeller blade may be altered in the horizontal direction and some joints and/or sections may be altered in the vertical direction.

In still other examples, the joints may be configured to provide adjustment in a rotational (z) direction such that the pitch of a section of the propeller blade may be altered and/or adjustment in a lateral direction such that the overall length of the propeller blade can be extended and/or retracted. Likewise, in some examples, the joints of the propeller blade may enable movement of the sections in the horizontal direction, vertical direction, rotational direction, and/or lateral direction (extension/contraction). Accordingly, multiple different shapes of a propeller blade may be realized with the joints of the propeller blades, each shape generating a sound profile and lifting force at different rotational speeds. Accordingly, multiple different sound profiles may be available for a commanded lifting force by altering the shape and/or rotational speed of the propeller.

Figure 4:
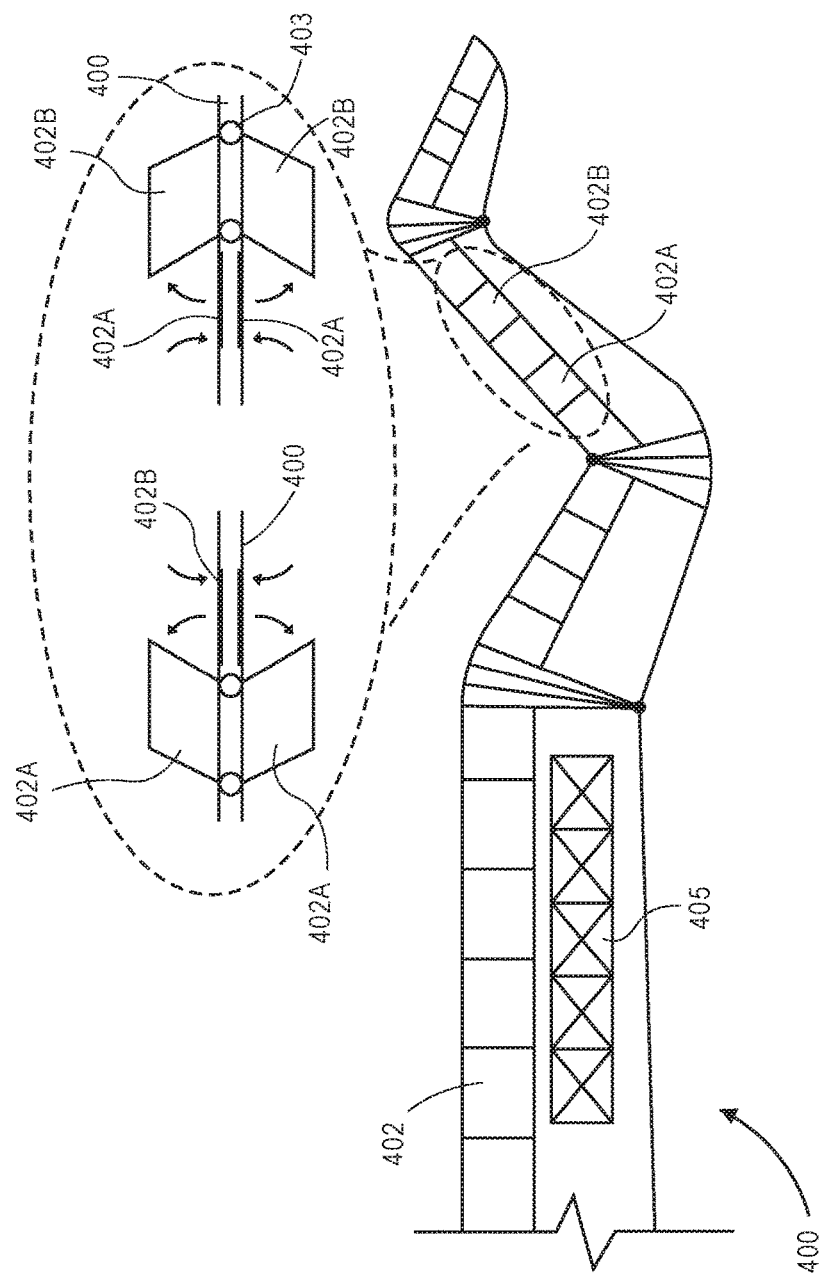
FIG. 4 is a block diagram of an adjustable propeller blade, according to an implementation.

In some implementations, one or more sections of the propeller blade may include adjustable sound flaps that may be extended or retracted to further alter the sound generated by the propeller blade as it rotates. For example, FIG. 4 is a block diagram of an adjustable propeller blade that includes a plurality of sound flaps 402 positioned on each section of the propeller blade 400, according to an implementation. In this example, the sound flaps are positioned on the leading edge of the propeller blade on both the top and bottom of the propeller blade. As illustrated in the expanded view, the sound flaps may open and close as the propeller rotates so that the air passing over the propeller blade is disrupted, thereby altering the sound generated by the propeller as it rotates.

In some implementations, the sound flaps 402 may be configured to open and close in a controlled pattern such that when a first sound flap 402A is open, the adjacent sound flap 402B is closed. When the first sound flap 402A closes, the adjacent sound flap 402B opens. This controlled pattern may continue such that the flaps open and close as the propeller blade rotates. In other implementations, the pattern may be altered and/or the sound flaps may open and close in a random or pseudo random pattern. By altering the speed at which the flaps open and close, the degree or angle to which they open and close, and/or by altering the pattern in which the sound flaps open and close, the sound generated by the propeller as it rotates may be further altered. Likewise, in some implementations the lifting force of the propeller may be altered based on the configuration in which the sound flaps are opened and/or closed.

The sound flaps may be coupled to the propeller adjustment controlled and be configured to open and/or close based on the rotational speed of the propeller. For example, referring briefly to FIG. 5, the guide rails 519-1, 519-2 may include protrusions 503 that extend toward the sound flaps 505. Likewise, the underneath side of the sound flaps may include one or more ridges 507. As the guide rails 519 adjust the protrusions 503 of the guide rails 519 contact the ridges 507 of the sound flaps 505 causing the sound flaps 505 to rise (open) or fall (close). In other implementations, the sound flaps may be individually addressable and/or independently mechanically controlled so that different sound flaps may be opened or closed by the propeller adjustment controller based on a desired sound profile and/or lifting force for the propeller. For example, an actuator, such as a piezoelectric actuator may be positioned under each sound flap such that when the actuator is extended, the sound flap opens. Alternatively, returning to FIG. 4, the hinges 403 of the sound flaps 402 that connect the sound flaps 402 to the propeller blade 400 may include servo motors that can open and/or close the flaps. The actuators or servo motors may be configured for wireless communication so that they can be activated and controlled by the propeller adjustment controller wirelessly. Likewise, in some implementations, the actuators and/or servo motors may receive power from the rotation of the propellers, from one or more solar panels 405 coupled to the surface of the propeller blade 400, a motion based power source that stores power generated from a rotation of the propeller, etc.

While FIG. 4 illustrates the sound flaps being positioned on the leading edge of the propeller blade 400, in other implementations, the sound flaps may be positioned elsewhere on the propeller blade. For example, the sound flaps may be only positioned on the top or upper surface of the propeller blade, may be only positioned on the bottom or lower surface of the propeller blade, may be randomly positioned over the entirety of the propeller blade, may be aligned in rows along the upper and/or lower surface of the propeller blade, etc. Likewise, the size, shape and/or number of sound flaps may vary with different implementations.

FIG. 5 is a diagram of an adjustment controller 500 for an adjustable propeller blade, according to an implementation. The illustrated adjustment controller 500 may be part of a propeller adjustment controller and may be used alone to alter the shape of the propeller blades and/or may be used in combination with a counterweight. For example, the adjustment controller 500 may include a series of gears 502, 504 that can be used to extend or retract the cables 519, and/or open and close the sound flaps, as discussed above. For example, a processor of the aerial vehicle may determine a desired propeller blade shape and cause a motor (not shown) that drives gear 502 to rotate the gear in a first direction. When the gear 502 rotates in the first direction, it causes the first cable 519-1 to retract and also causes the second gear 504 to rotate. In a similar manner, the rotation of the second gear 504 causes the second cable 519-2 to retract. By retracting the cables 519, which are coupled to the joints, causes the joints of the propeller blade flex, thereby altering the shape of the propeller blade, as discussed above with respect to FIGS. 2A-3B. Likewise, the protrusions 503, as the cables 519 move, may contact the ridges 507 on the underneath side of the sound flaps 505 causing the sound flaps to open or close. In some implementations, the guide rails 519 may not include the ridges and/or be positioned to contact the sound flaps.

In another implementation, the adjustment controller 500 may be positioned at each joint within the propeller blade and each joint may be independently controlled by each of multiple adjustment controllers 500. For example, the gears 502, 504 may be coupled directly to a joint of the propeller blade such that the joint will flex or bend in one or more directions (e.g., x, y, and z) as the gears rotate. In one example, the propeller adjustment controller may send instructions directly to each adjustment controller 500 at each joint that cause the gears to rotate and flex the joint a desired amount. In another example, as the counterweight moves, it causes the cables 519 to move, which in turn move the gears. As the gears rotate, the joint flexes.

Figure 6:
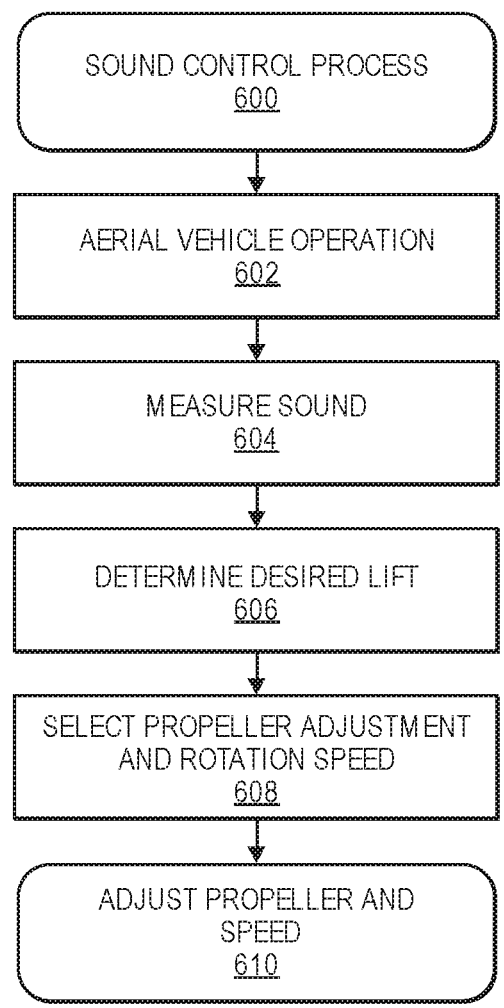
FIG. 6 is a flow diagram of an active sound control process, according to an implementation.

FIG. 6 is a flow diagram illustrating an example process 600 for active propeller blade adjustment for sound control, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 may operate independently at each propeller and/or may be performed by a central system and propeller adjustment instructions sent by the central system to each of the respective propeller adjustment controllers. The example process 600 begins when an aerial vehicle that includes one or more propeller adjustment controllers is operational, as in 602. In some implementations, the example process 600 may only operate when the aerial vehicle is airborne and/or the motors are rotating. In other implementations, the example process 600 may be active at any time in which the aerial vehicle is powered.

When the aerial vehicle is operational, sound generated by and/or around the aerial vehicle is measured by a sensor of the aerial vehicle, as in 604. For example, a sensor, such as a microphone, may detect and measure sound generated by or around an aerial vehicle. As discussed above, sensors may be positioned at each propeller and independently measure sounds near those propellers. In other implementations, sensors may be positioned on the body of the aerial vehicle.

In addition to measuring sound, the example process determines the lift to be generated by each of the propellers, as in 606. The lift for each propeller may be determined based on the commanded flight path, navigation instructions, altitude, heading, wind, etc.

Based on the measured sound and the determined lift for the propeller, a propeller shape and rotational speed is selected that will generate an anti-sound and produce the desired amount of lift, as in 608. For example, the anti-sound may be the measured sound with a 180 degree phase shift such that the anti-sound is effectively an inverse of the measured sound. As discussed above, there may be multiple propellers shapes and speeds that will generate the desired lift and different sounds. For example, the aerial vehicle may maintain or be provided a table, similar to Table 1 below, that includes different propeller shapes, sounds profiles, rotational speeds, and corresponding lifting forces. Because there are potentially multiple configurations that will generate a similar sound profile, the example process may also consider a power draw for the different propeller shapes that will generate the same lifting force at a rotational speed and select a propeller shape that will generate a particular sound profile and a commanded lifting force that requires the least amount of power. In selecting a propeller shape, the aerial vehicle may query the stored table to select a desired propeller shape and speed to generating the desired anti-sound and lift.

TABLE 1

| Propeller Shape | Propeller RPM | Lift | Power | Sound |
|---|---|---|---|---|
| S1 | 4,500 | 120N | 1,000 W | 88 dB at 622 Hz |
| S1 | 2,800 | 80N | 800 W | 78 dB at 800 Hz |
| S1 | 4,000 | 100N | 900 W | 80 dB at 900 Hz |
| S1 | 4,300 | 110N | 950 W | 85 dB at 974 Hz |
| S2 | 3,000 | 110N | 950 W | 88 dB at 622 Hz |
| S2 | 2,500 | 55N | 750 W | 78 dB at 800 Hz |
| S2 | 2,800 | 60N | 775 W | 80 dB at 900 Hz |
| S2 | 2,900 | 65N | 800 W | 85 dB at 974 Hz |
| S3 | 4,000 | 40N | 750 W | 88 dB at 622 Hz |
| S3 | 2,500 | 35N | 700 W | 78 dB at 800 Hz |
| S3 | 3,000 | 38N | 725 W | 80 dB at 900 Hz |
| S3 | 3,500 | 39N | 735 W | 85 dB at 974 Hz |
| ... | ... | ... | | ... |
| SN | 3,600 | 100N | 800 W | 85 dB at 974 Hz |

Instructions are then sent to cause the shape of the propeller to be adjusted and the rotational speed of the propeller motor to be adjusted so that the desired anti-sound and lift are generated by the propeller, as in 610. Upon adjustment of the propeller shape and rotational speed, and while the aerial vehicle is operational, the example process 600 returns to block 604 and continues.

Figure 7A:
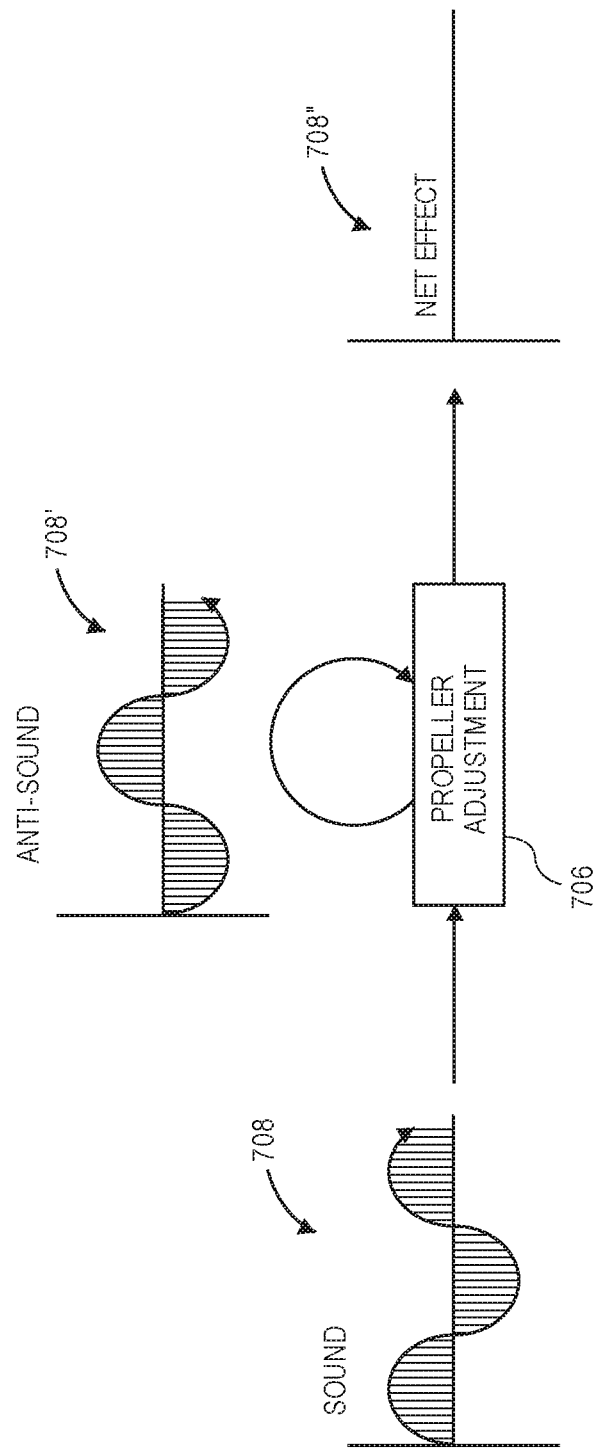
FIGS. 7A-7D are block diagrams illustrating active airborne sound control, according to an implementation.

FIGS. 7A-7D are block diagrams illustrating active sound control system configurations in which a propeller blade shape is adjusted and/or the rotational speed of the propeller is adjusted to generate different anti-sounds, according to an implementation. Turning first to FIG. 7A, illustrated is a block diagram in which the active sound control system includes only a propeller with a propeller adjustment controller that operates based on the rotational speed of the propeller, such as those discussed above with respect to FIGS. 2A-3B. In such a configuration, sound may not be measured and the shape of the propeller may be adjusted as a function of the rotational speed of the propeller.

In such a configuration, aerial vehicle sounds may be generated and measured over a period of time and an adjustable propeller designed such that the shape of the propeller will vary based on the rotational speed of the propeller. By knowing the anticipated sounds of the aerial vehicle, the shape and adjustment of the propeller may be selected so that the propeller will generate anti-sounds 708' that combine with the generated sound 708 during aerial vehicle operation. The anti-sound 708', when combined with the generated sound 708, results in a net effect 708" of reduced or no sound generated from that portion of the aerial vehicle. While the example illustrated in FIG. 7A shows a net effect 708" of no sound, in some implementations, the sound may only be reduced or partially suppressed such that the net effect 708" is a reduced sound. In other implementations, the sound may be otherwise modified. For example, rather than suppressing or just reducing the sound, the anti-sound 708' may combine with the sound 708 to generate a net effect 708" that results in an audible sound that is more desirable (e.g., has a different frequency). During operation of the aerial vehicle, the shape of the propeller may periodically change so that the resulting anti-sound can be altered or adjusted to account for changes in the sound. For example, as the aerial vehicle descends, the generated noise may change and/or the lift to be generated by the propeller may be reduced. To account for the changes, the shape of the propeller may adjust as the rotation of the propeller blade decreases, thereby generating an altered anti-sound.

Figure 7B:
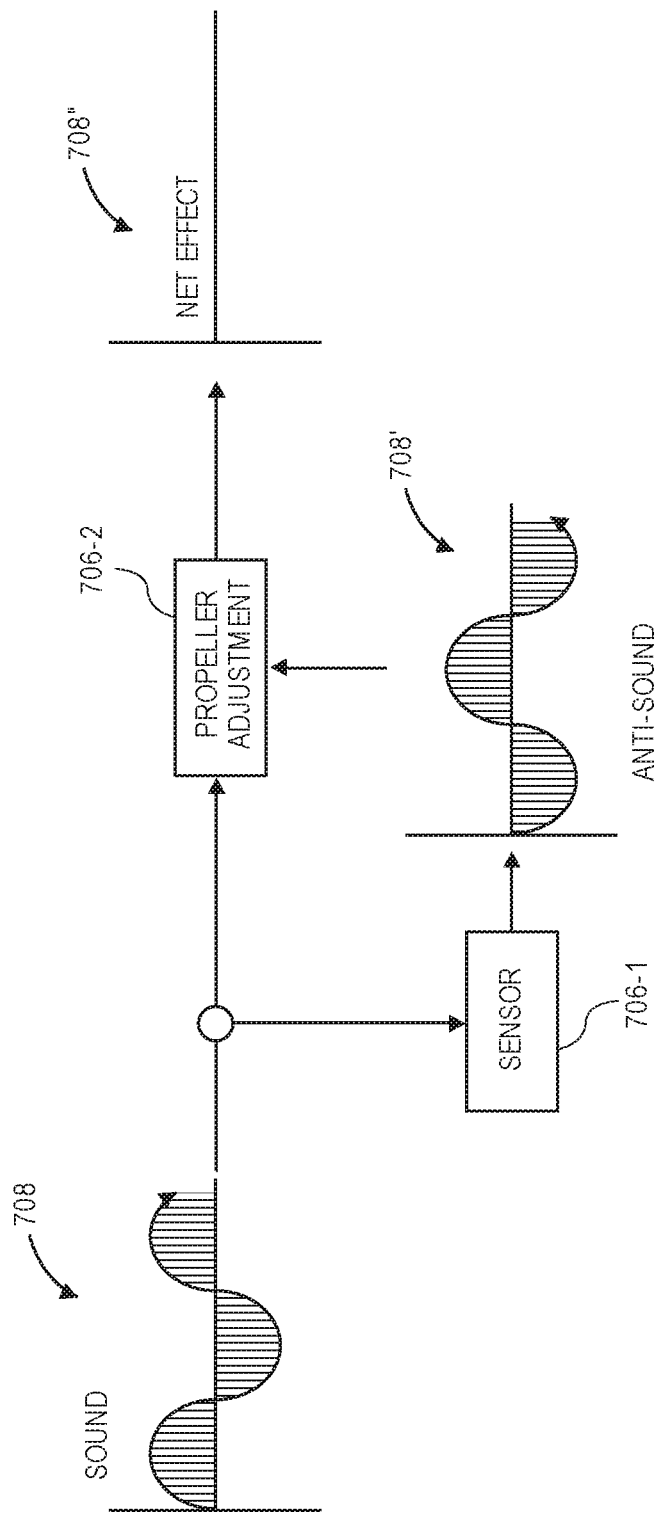

FIG. 7B illustrates a block diagram in which the active mechanical sound control systems includes a sensor 706-1 and a propeller adjustment controller 706-2. In this illustrated configuration, the mechanical sound control system utilizes a feed-forward control. In feed-forward, the sensor measures the sound generated by or around the aerial vehicle and feeds that sound or the anti-sound forward so that the propeller adjustment controller 706-2 can select a propeller shape and rotational speed that will generate the anti-sound 708'. This is done without considering the net effect or output from the combined measured sound and anti-sound.

Upon receiving the measured sound 708 or anti-sound 708 and determining a propeller shape and rotational speed, the propeller adjustment controller 706-2 alters the shape and/or rotational speed of the propeller to generate the determined anti-sound. Similar to FIG. 7A, the anti-sound 708', which may be the measured sound phase shifted 180 degrees, when combined with the sound 708, results in a net effect 708" of reduced or no sound from the area of the UAV where the propeller and sensor are positioned.

While the example illustrated in FIG. 7B describes that the sensor measures the sound and provides it to the propeller adjustment controller 706-2, in other implementations, the sensor 706-1 may provide the measured sound to another computing component that determines a propeller shape and rotational speed that is to be used to generate a desired anti-sound. That computing component may then provide instructions to the propeller adjustment controller 706-2 to alter the shape and rotational speed of the propeller so that the anti-sound is generated. Likewise, while the example illustrated in FIG. 7B shows a net effect 708" of no sound, in some implementations, the sound may only be reduced or partially suppressed.

Figure 7C:
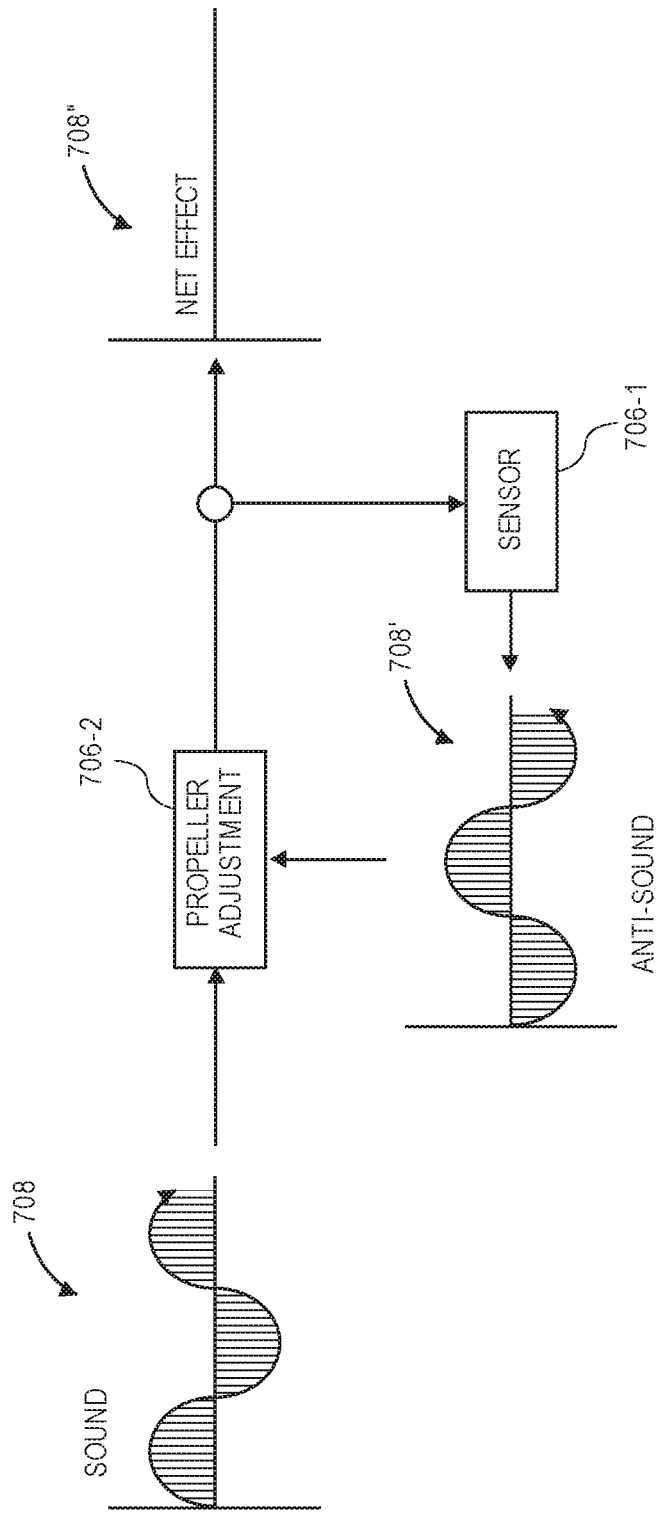

FIG. 7C illustrates a block diagram in which the active sound control system includes a sensor 706-1 and a propeller adjustment controller 706-2. In this illustrated configuration, the sound control system utilizes a feedback control. In feedback, the sensor 706-1 measures the output or net effect 708" resulting from a combination of the sound 708 and the anti-sound 708' generated by the propeller shaped according to the propeller adjustment controller 706-2. The measured sound or anti-sound is fed back to the propeller adjustment controller. Based on the updated anti-sound, a propeller shape and rotational speed is determined that will cause the propeller to generate the anti-sound. With a feedback control, the net effect 708" is considered and utilized to generate or update the anti-sound 708' that is used to select a propeller shape and/or propeller rotational speed. Upon determining the updated propeller shape and rotational speed needed to generate the updated anti-sound, the propeller adjustment controller adjusts the shape and rotational speed of the propeller so that the updated anti-sound is generated.

While the example illustrated in FIG. 7C describes that the sensor 706-1 feeds back the measured net effect 708" to the propeller adjustment controller, in other implementations, the sensor 706-1 may provide the measured net effect 708" to another computing system that determines an anti-sound and a propeller shape and rotational speed combination to generate the anti-sound and provide the commanded lift from the propeller. That computing system may then provide the propeller shape and rotational speed to the propeller adjustment controller that adjusts the shape and/or rotational speed of the propeller so that the shaped propeller will generate the anti-sound 708'. Likewise, while the example illustrated in FIG. 7C shows a net effect 708" of no sound, in some implementations, the sound may only be reduced or partially suppressed.

Figure 7D:
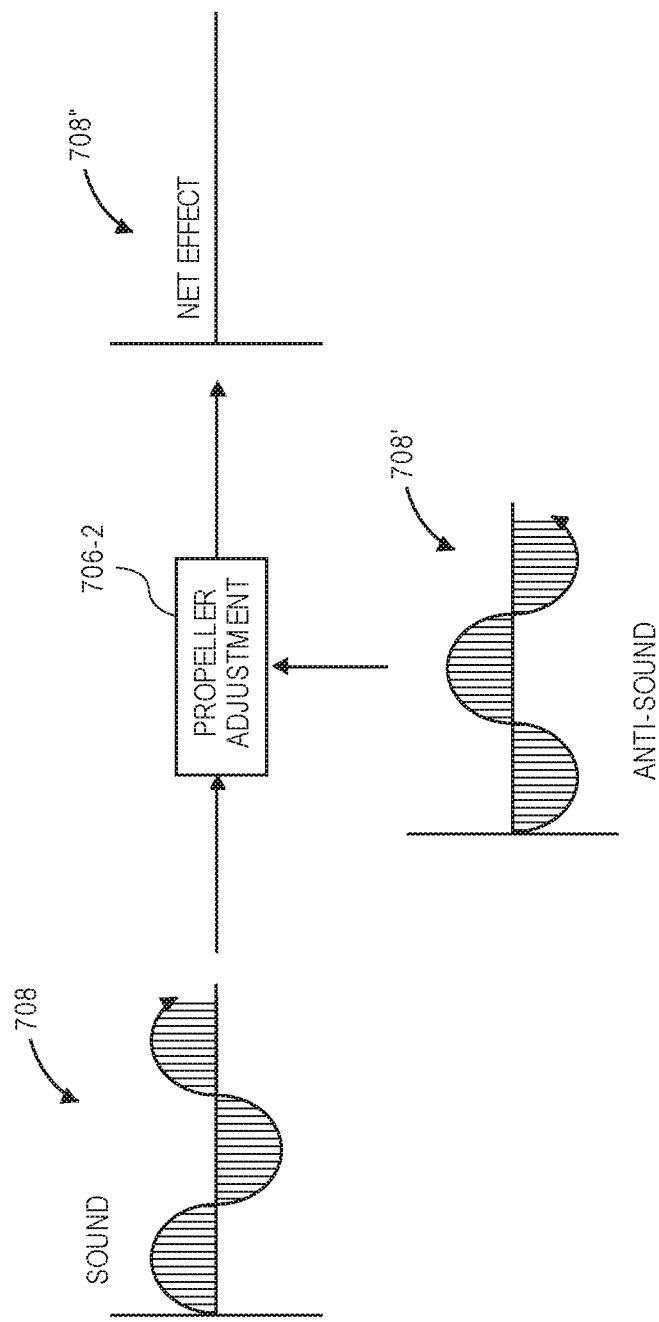

FIG. 7D illustrates a block diagram in which the active sound control system only includes a propeller adjustment controller 706-2 and does not include a sensor. In this configuration, the anti-sound and corresponding propeller shape and rotational speed that will generate the desired anti-sound and commanded lift may be determined based on a machine-learned model that considers the operational and/or environmental conditions of the aerial vehicle. Based on the operational and/or environmental conditions, a predicted sound is determined and a corresponding anti-sound 708' is provided to the propeller adjustment controller 706-2. Upon receiving the anti-sound, the propeller adjustment controller 706-2 selects a propeller shape and rotational speed combination that will generate the desired anti-sound 708' and cause the propeller to adjust to the desired shape and rotational speed. Like the other examples, the sound 708 and the generated anti-sound 708' combine to produce a net effect 708" that is either no sound at or near the propeller or a reduced sound at or near the propeller.

While the example illustrated in FIG. 7D describes that an anti-sound signal is determined from a predicted sound and provided to the propeller adjustment controller 706-2, in other implementations, the predicted sound may be provided to another computing component and that computing component may determine the propeller shape and rotational speed that will generate the desired anti-sound and commanded lift. Likewise, while the example illustrated in FIG. 7D shows a net effect 708" of no sound, in some implementations, the sound may only be reduced or partially suppressed.

The propeller shape that may be adjusted with respect to the examples illustrated in FIGS. 7A-7D may include a propeller blade shape alteration in the horizontal (x) direction, vertical (y) direction, rotational (z) direction, and/or a configuration for opening and/or closing of sound flaps positioned on sections of the propeller blade.

Referring to FIGS. 8A-8D, views of aspects of one system 800 for active airborne propeller shape adjustment for sound control in accordance with an implementation are shown. The illustration corresponding to FIGS. 8A-8D provides additional details of an example implementation for predicting an anti-sound and determining a propeller shape and rotational speed that will generate the anti-sound, as illustrated in FIG. 7D.

Figure 8A:
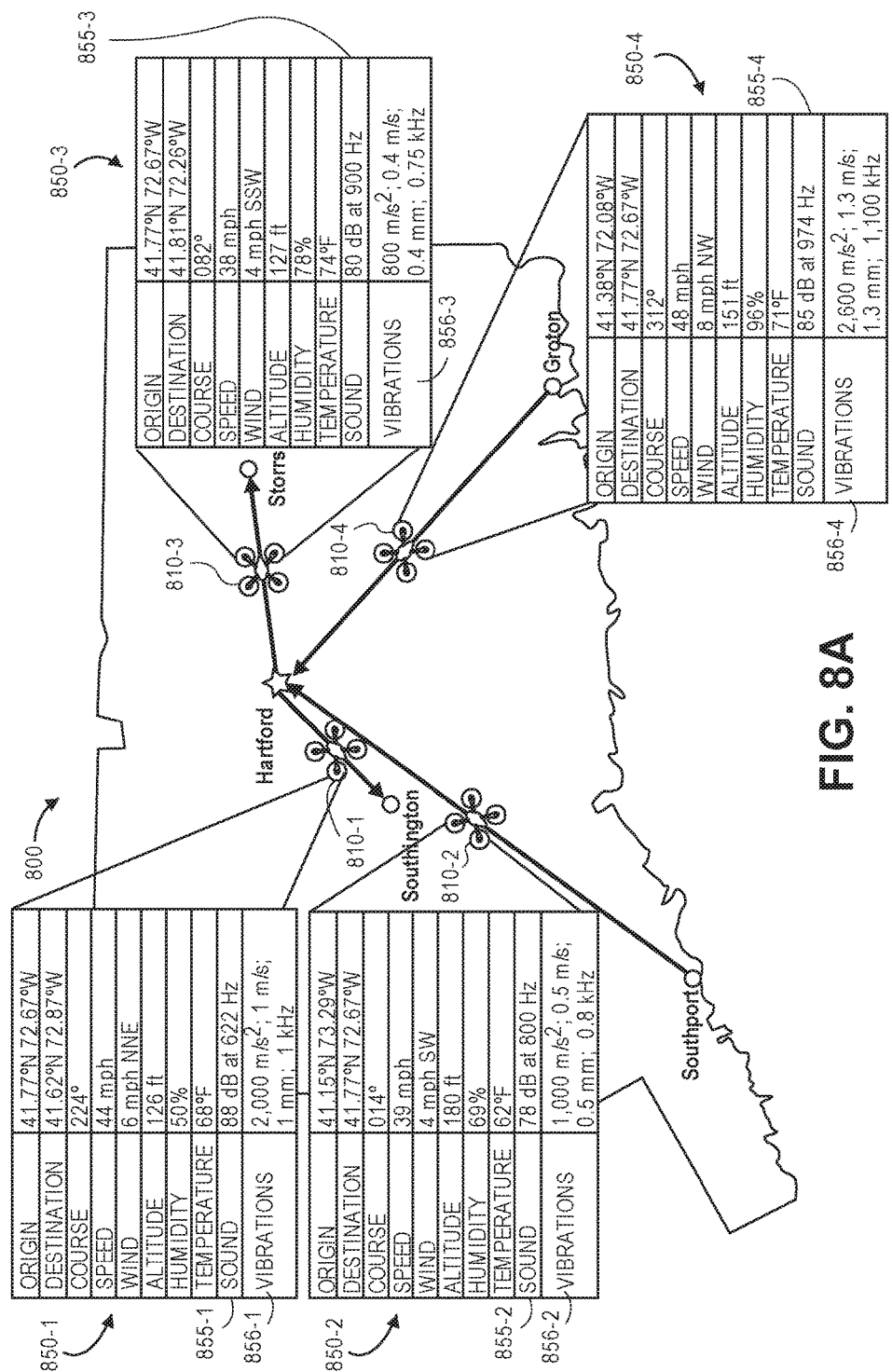
FIGS. 8A through 8D are views of aspects of one system for active airborne sound control, according to an implementation.

FIG. 8A illustrates a plurality of aerial vehicles 810-1, 810-2, 810-3, 810-4 that are engaged in flight between origins and destinations. For example, the aerial vehicle 810-1 is shown en route between Hartford, Conn., and Southington, Conn., while the aerial vehicle 810-2 is shown en route between Southport, Conn., and Hartford. The aerial vehicle 810-3 is shown en route between Groton, Conn., and Hartford, while the aerial vehicle 810-4 is shown en route between Hartford and Storrs, Conn. The aerial vehicles 810-1, 810-2, 810-3, 810-4 are configured to capture extrinsic or intrinsic information or data 850-1, 850-2, 850-3, 850-4 regarding the aerial vehicles 810-1, 810-2, 810-3, and 810-4 and the environments in which the aerial vehicles 810-1, 810-2, 810-3, 810-4 are operating, including but not limited to information or data regarding locations, altitudes, courses, speeds, climb or descent rates, turn rates, accelerations, wind velocities, humidity levels and temperatures, sounds, etc., using one or more sensors. The aerial vehicles 810-1, 810-2, 810-3, 810-4 are also configured to capture sounds 855-1, 855-2, 855-3, and 855-4, and vibrations 856-1, 856-2, 856-3, and 856-4 generated by the aerial vehicles during their respective flights.

For example, as is shown in the information or data 850-1 of FIG. 8A, the aerial vehicle 810-1 is traveling on a course of 224° and at a speed of 44 miles per hour (mph), in winds of 6 mph out of the north northeast, at an altitude of 126 feet, in air having 50 percent humidity and a temperature of 68 degrees Fahrenheit (° F.), and the sound measured around the aerial vehicle 810-1 is 88 decibels ("dB") at 622 Hz. The information or data 850-2 of FIG. 8A indicates that the aerial vehicle 810-2 is traveling on a course of 014° and at a speed of 39 mph, in winds of 4 mph out of the southwest, at an altitude of 180 feet, in air having 69 percent humidity and a temperature of 62° F., and that the sound around the aerial vehicle 810-2 is 78 dB at 800 Hz. The information or data 850-3 of FIG. 8A indicates that the aerial vehicle 810-3 is traveling on a course of 082° and at a speed of 38 mph, in winds of 4 mph out of the south southwest, at an altitude of 127 feet and in air having 78% humidity, a temperature of 74° F., and that the sound measured around the aerial vehicle 810-3 is 80 dB at 900 Hz. Finally, the information or data 850-4 of FIG. 8A indicates that the aerial vehicle 810-4 is traveling on a course of 312° and at a speed of 48 mph, in winds of 8 mph out of the northwest, at an altitude of 151 feet and in air having 96 percent humidity and a temperature of 71° F., and that the sound measured around the aerial vehicle 810-4 is 85 dB at 974 Hz. While the illustration in FIG. 8A only shows sound measurements for a single location on the aerial vehicle, it will be appreciated that the information or data 855 may include sounds measured adjacent or near each propeller of each aerial vehicle. For example, if aerial vehicle 810-1 includes eight propellers, it may also include eight sensors that measure sound data 855. The operational information may also indicate the propeller shape of each propeller blade, the rotational speed, and/or the power draw required to generate the commanded lifting for to aerially navigate the aerial vehicle.

Figure 8B:
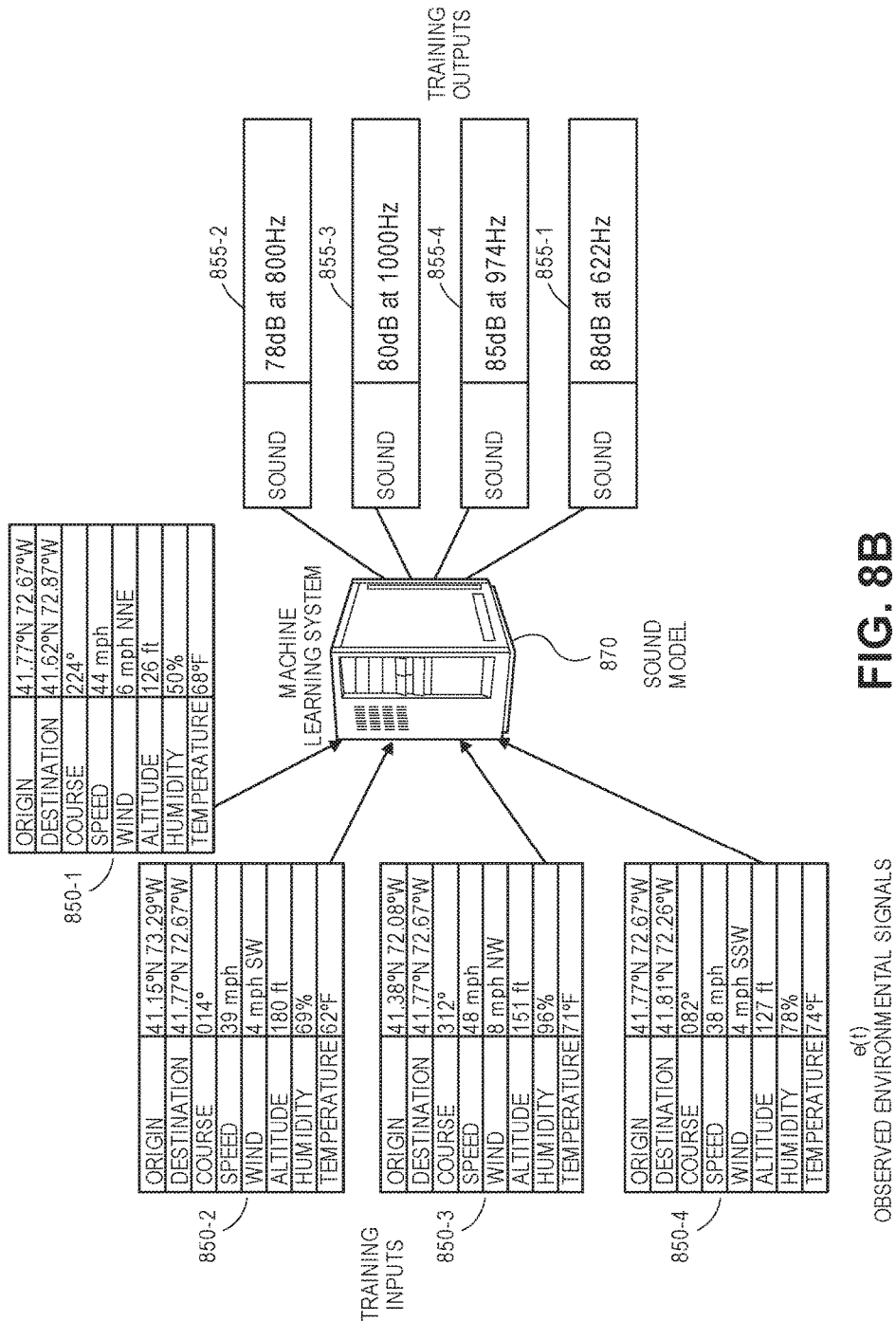

In accordance with the present disclosure, the aerial vehicles 810-1, 810-2, 810-3, 810-4 may be configured to provide both the extrinsic and intrinsic information or data 850-1, 850-2, 850-3, 850-4 (e.g., information or data regarding environmental conditions, operational characteristics or tracked positions of the aerial vehicles 810-1, 810-2, 810-3, 810-4), and also the information or data 855-1, 855-2, 855-3, 855-4 regarding the sounds recorded during the transits of the aerial vehicles 810-1, 810-2, 810-3, 810-4, to a data processing system. The information or data 850-1, 850-2, 850-3, 850-4 and the information or data 855-1, 855-2, 855-3, 855-4 may be provided to the data processing system either in real time or in near-real time while the aerial vehicles 810-1, 810-2, 810-3, 810-4 are in transit, or upon their arrival at their respective destinations. Referring to FIG. 8B, the extrinsic and intrinsic information or data 850-1, 850-2, 850-3, 850-4, e.g., observed environmental signals e(t), is provided to a machine learning system 870 as a set of training inputs, and the information or data 855-1, 855-2, 855-3, 855-4, e.g., measured sound data, regarding the sounds recorded by each of the sensors during the transits of the aerial vehicles 810-1, 810-2, 810-3, 810-4 is provided to the machine learning system 870 as a set of training outputs for each of the sound control systems of the aerial vehicle. As discussed above, the sound data will be included for each propeller adjustment controller of the aerial vehicle.

The machine learning system 870 may be fully trained using a substantial corpus of observed environmental signals e(t) correlated with measured sounds that are obtained using each of the sensors of one or more of the aerial vehicles 810-1, 810-2, 810-3, 810-4, and others, to develop sound models for each propeller adjustment controller dependent on the location of the sensors on the aerial vehicles. After the machine learning system 870 has been trained, and the sound models developed, the machine learning system 870 may be provided with a set of extrinsic or intrinsic information or data (e.g., environmental conditions, operational characteristics, or positions) that may be anticipated in an environment in which an aerial vehicle is operating or expected to operate and the machine learning system 870 will provide predicted sounds for each propeller adjustment controller of the aerial vehicle. In some implementations, the machine learning system 870 may reside and/or be operated on one or more computing devices or machines provided onboard one or more of the aerial vehicles 810-1, 810-2, 810-3, and 810-4. The machine learning system 870 may receive information or data regarding the corpus of sound signals observed and the sounds measured by sensors of the other aerial vehicles 810-1, 810-2, 810-3, 810-4, for training purposes and, once trained, the machine learning system 870 may receive extrinsic or intrinsic information or data that is actually observed by the aerial vehicle, e.g., in real time or in near-real time, as inputs and may generate outputs corresponding to predicted sounds based on the information or data.

In other implementations, the machine learning system 870 may reside and/or be operated on one or more centrally located computing devices or machines. The machine learning system 870 may receive information or data regarding the corpus of sounds measured by sensors of each of the aerial vehicles 810-1, 810-2, 810-3, and 810-4. Once the machine learning system 870 is trained, the machine learning system 870 may be used to program computing devices or machines of the aerial vehicles in a fleet with sound models that predict sounds at different propeller adjustment controllers during operation of the aerial vehicle, based on extrinsic or intrinsic information or data that is actually observed by the respective aerial vehicle. In still other implementations, the machine learning system 870 may be programmed to receive extrinsic or intrinsic information or data from operating aerial vehicles, e.g., via wireless means, as inputs. The machine learning system 870 may then generate outputs corresponding to predicted sounds at different propeller adjustment controllers on the aerial vehicle based on the received information or data and return such predicted sounds to the aerial vehicles. For example, the aerial vehicle and the machine learning system 870 may exchange batches of information that is collected over a period of time. For example, an aerial vehicle may measure extrinsic and/or intrinsic information or data for a period of three seconds (or any other period of time) and transmit that measured information or data to the machine learning system 870. The machine learning system, upon receiving the information or data, generates outputs corresponding to predicted sounds at different propeller adjustment controllers on the aerial vehicle based on the received information or data and transmits those outputs to the aerial vehicle. The aerial vehicle may then use the received outputs to determine a propeller shape and corresponding rotational speed that will generate a corresponding anti-sound and produce the commanded lift for the propeller. This process may continue while the aerial vehicle is in-flight or operational.

For example, when variables such as an origin, a destination, a speed and/or a planned altitude for the aerial vehicle 810 (e.g., a transit plan for the aerial vehicle) are known, and where variables such as environmental conditions and operational characteristics may be known or estimated, such variables may be provided as inputs to the trained machine learning system 870. Subsequently, sounds that may be predicted at each propeller and/or propeller adjustment controller of the aerial vehicle 810 as the aerial vehicle 810 travels from the origin to the destination within such environmental conditions and according to such operational characteristics may be received from the trained machine learning system 870 as outputs. From such outputs, propeller shapes and rotational speeds may be determined that will generate anti-sounds, e.g., one or more sounds that are substantially equal in intensity and opposite in phase to the predicted sounds, may be determined and implemented in real time or near-real time as the aerial vehicle 810 is en route from the origin to the destination.

Figure 8C:
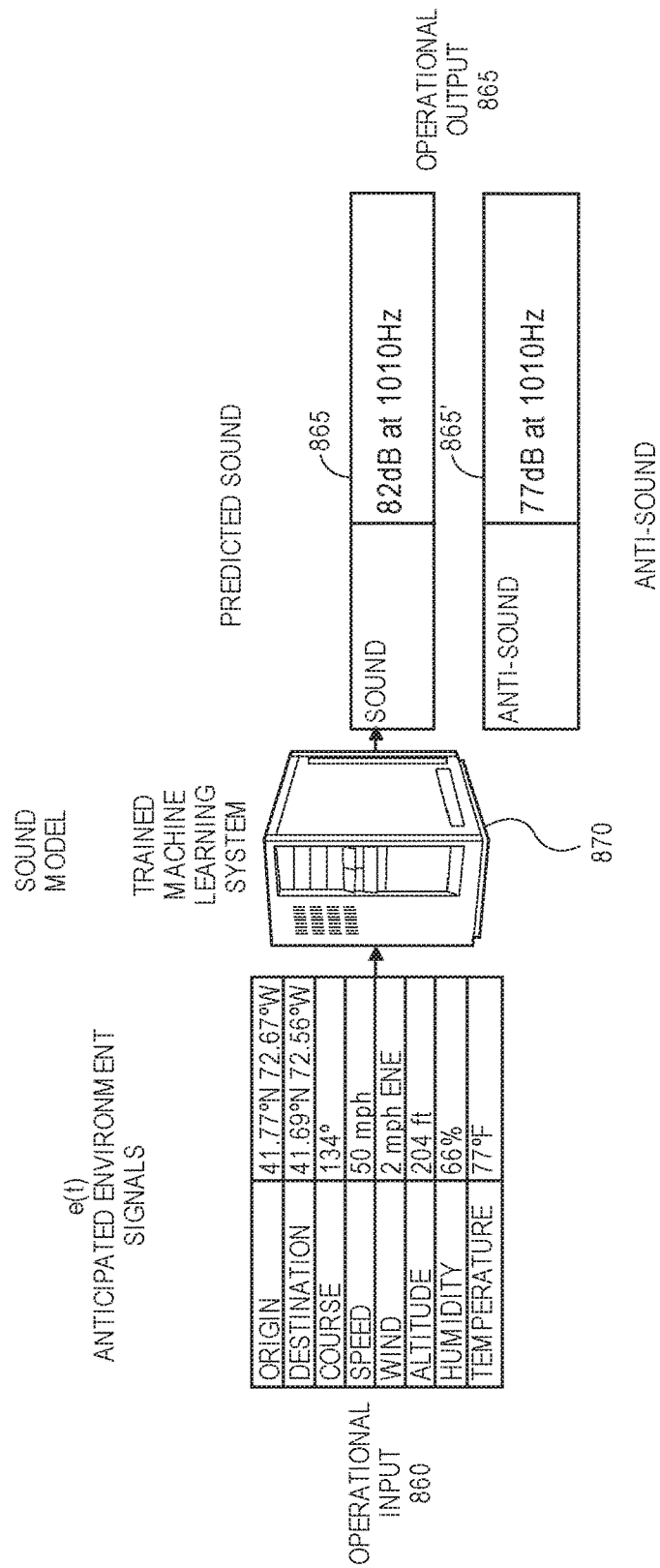

Referring to FIG. 8C, an operational input 860 in the form of environmental signals e(t) is provided to the trained machine learning system 870, and an operational output 865 in the form of predicted sound is produced by the sound model and received from the trained machine learning system 870. For example, the operational input 860 may include extrinsic or intrinsic information or data regarding a planned transit of an aerial vehicle (e.g., predicted environmental or operational conditions), or extrinsic or intrinsic information or data regarding an actual transit of the aerial vehicle (e.g., actually observed or determined environmental or operational conditions), including but not limited to coordinates of an origin, a destination, or of any intervening points, as well as a course and a speed of the aerial vehicle, a wind velocity in a vicinity of the origin, the destination or one or more of the intervening points, an altitude at which the aerial vehicle is expected to travel, and a humidity level and a temperature in a vicinity of the origin, the destination or one or more of the intervening points. The operational output 865 may include information regarding sounds at various propellers of the aerial vehicle that are expected to occur when the aerial vehicle operates in a manner consistent with the operational input 860, e.g., when the aerial vehicle travels along a similar course or speed, or at a similar altitude, or encounters a similar wind velocity, humidity level, or temperature.

Based at least in part on the operational output 865 that was determined based on the operational input 860, an anti-sound 865', e.g., a sound having an amplitude and frequency that is one hundred eighty degrees out-of-phase with the operational output 865. In some implementations, the intensity of the anti-sound 865' may be selected to completely cancel out or counteract the effects of the sounds associated with the operational output 865, e.g., such that the intensity of the anti-sound 865' equals the intensity of the predicted sound during operation of the aerial vehicle 810, or of the sounds that actually occur. Alternatively, in some implementations, as illustrated in FIG. 8C, the intensity of the anti-sound 865' may be selected to otherwise modify or counteract the effects of sound associated with the operational output 865, e.g., such that the intensity of the anti-sound 865' is less than the intensity of the predicted sound.

Those of ordinary skill in the pertinent arts will recognize that any type or form of machine learning system (e.g., hardware and/or software components or modules) may be utilized in accordance with the present disclosure. For example, a sound may be associated with one or more of an environmental condition, an operating characteristic or a physical location or position of an aerial vehicle according to one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses. Using any of the foregoing algorithms or techniques, or any other algorithms or techniques, a relative association between measured sound and such environmental conditions, operating characteristics or locations of aerial vehicles may be determined.

In some implementations, a machine learning system may identify not only a predicted sound but also a confidence interval, confidence level or other measure or metric of a probability or likelihood that the predicted sound will occur at a propeller or other location on the frame of the aerial vehicle in a given environment that is subject to given operational characteristics at a given position. Where the machine learning system is trained using a sufficiently large corpus of recorded environmental signals and sounds, and a reliable sound model is developed, the confidence interval associated with an anti-sound identified thereby may be substantially high.

Although one variable that may be associated with sounds occurring at various propellers or other locations on a frame of an aerial vehicle is a position of the aerial vehicle (e.g., a latitude or longitude), and that extrinsic or intrinsic information or data associated with the position may be used to predict sounds occurring at propellers or other locations on the frame of the aerial vehicle at that position, those of ordinary skill in the pertinent arts will recognize that the systems and methods of the present disclosure are not so limited. Rather, sounds may be predicted for areas or locations having similar environmental conditions or requiring aerial vehicles to exercise similar operational characteristics. For example, because environmental conditions in Vancouver, British Columbia, and in London, England, are known to be generally similar to one another, information or data gathered regarding the sounds occurring at various propellers or other locations on the frame of aerial vehicles operating in the Vancouver area may be used to predict sounds that may occur at propellers or other locations on the frame of aerial vehicles operating in the London area, or to generate anti-sounds to be output by different shapes of propellers rotating at different speeds when operating in the London area. Likewise, information or data gathered regarding the sounds occurring at propellers or other locations on the frame of aerial vehicles operating in the London area may be used to predict sounds occurring at propellers or other locations on the frame of aerial vehicles operating in the Vancouver area, or to generate anti-sounds to be output by different shapes of propellers rotating at different speeds when operating in the Vancouver area.

In accordance with the present disclosure, a trained machine learning system may be used to develop sound profiles for different shapes of propellers operating at different rotational speeds for different aerial vehicles based on the sizes, shapes, or configurations of the aerial vehicles, and with respect to environmental conditions, operational characteristics, and/or locations of such aerial vehicles. Based on such sound profiles, anti-sounds may be determined for propeller adjustment controllers located on such aerial vehicles as a function of the respective environmental conditions, operational characteristics or locations and output on an as-needed basis. The propeller adjustment controllers may utilize the determined anti-sounds and commanded lift for a propeller to select a propeller configuration and rotational speed that will generate the determined anti-sound and corresponding commanded lift.

Figure 8D:
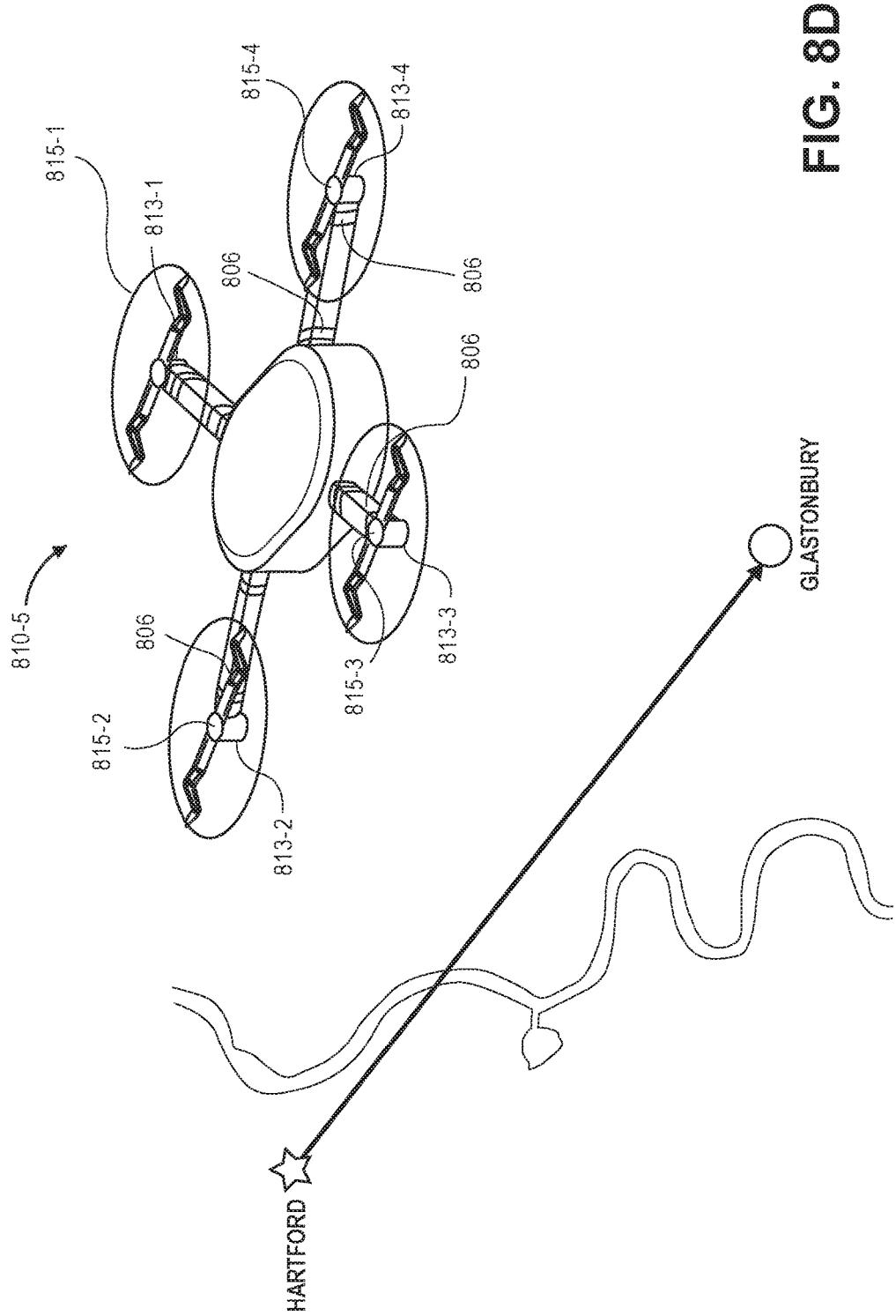

Referring to FIG. 8D, an aerial vehicle 810-5, including a plurality of propellers 813-1, 813-2, 813-3, 813-4 and a plurality of motors 815-1, 815-2, 815-3, 815-4 is shown en route from Hartford to Glastonbury, Conn. Each propeller 813 may generate the same or different sounds and sounds measured by sensors 806 at different locations on the aerial vehicle may be similar or different. To cancel out or reduce the measured sounds, an anti-sound is determined and a propeller shape and corresponding propeller speed is determined that will cause the shaped propeller to generate the determined anti-sound. As discussed above, the anti-sound may be determined based on actual sound measurements determined by sensors positioned on the aerial vehicle and/or the anti-sounds may be predicted based on intrinsic or extrinsic information or data. Likewise, each propeller 813-1, 813-2, 813-3, and 813-4 may be adjusted independently, may be shaped differently, rotate at different speeds, and/or generate different anti-sounds.

Figure 9:
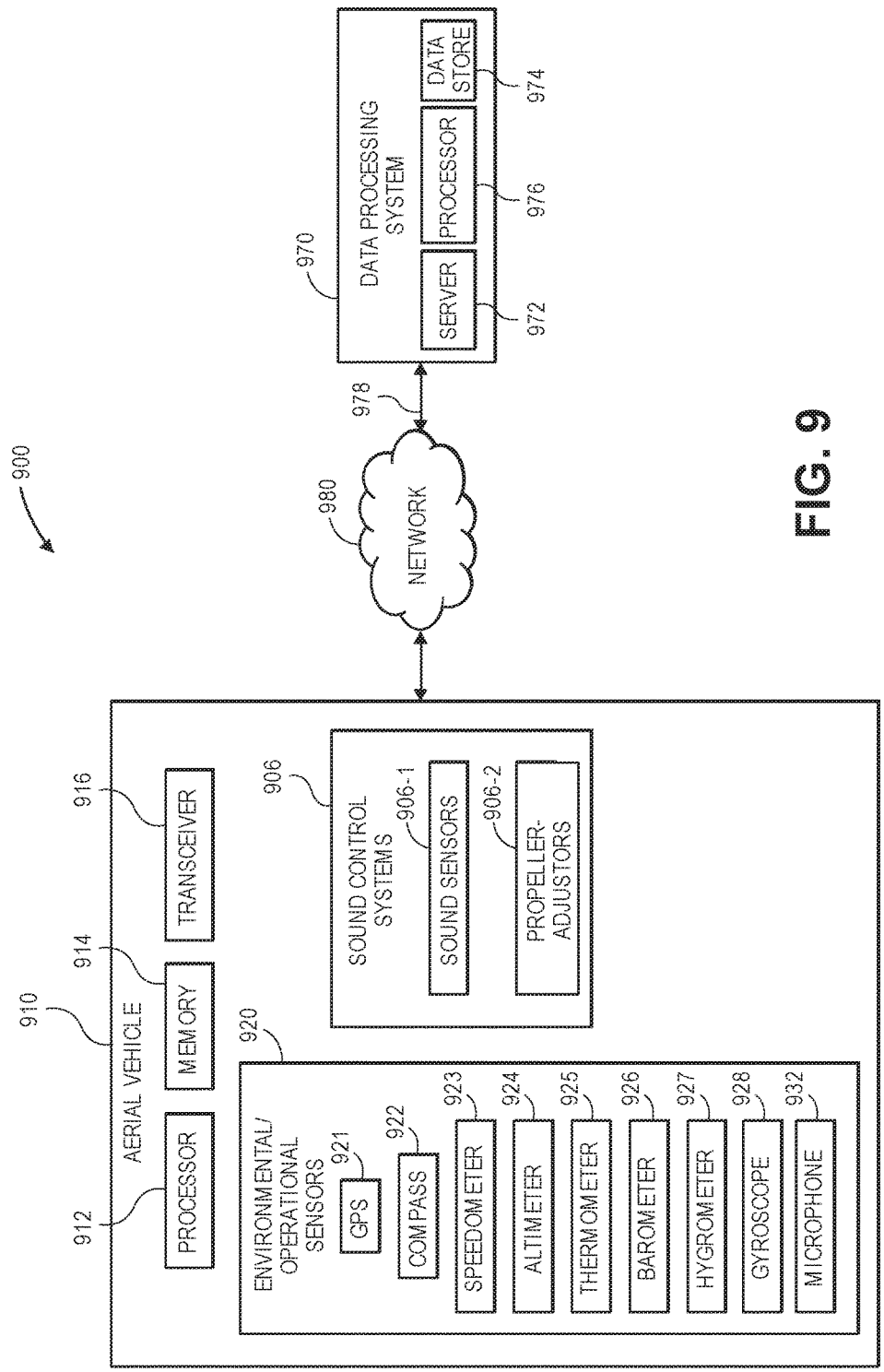
FIG. 9 is a block diagram of one system for active airborne sound control, according to an implementation.

Referring to FIG. 9, illustrated is a block diagram of components of one system 900 for active airborne propeller adjustment for sound control, in accordance with an implementation. The system 900 of FIG. 9 includes an aerial vehicle 910 and a data processing system 970 connected to one another over a network 980. The aerial vehicle 910 includes a processor 912, a memory 914 and a transceiver 916, as well as a plurality of environmental or operational sensors 920 and a plurality of sound control systems 906. Each sound control system may include a propeller adjustment controller 906-2 and optionally a sound sensor 906-1.

The processor 912 may be configured to perform any type or form of computing function, including but not limited to the execution of one or more machine learning algorithms or techniques. For example, the processor 912 may control any aspects of the operation of the aerial vehicle 910 and the one or more computer-based components thereon, including but not limited to the transceiver 916, the environmental or operational sensors 920, and/or the sound control systems 906. The aerial vehicle 910 may likewise include one or more control systems (not shown) that may generate instructions for conducting operations thereof, e.g., for operating one or more rotors, motors, rudders, ailerons, flaps or other components provided thereon. Such control systems may be associated with one or more other computing devices or machines, and may communicate with the data processing system 970 or one or more other computer devices (not shown) over the network 980, through the sending and receiving of digital data. The aerial vehicle 910 further includes one or more memory or storage components 914 for storing any type of information or data, e.g., instructions for operating the aerial vehicle, or information or data captured by one or more of the environmental or operational sensors 920 and/or the sound sensors 906-1.

The transceiver 916 may be configured to enable the aerial vehicle 910 to communicate through one or more wired or wireless means, e.g., wired technologies such as Universal Serial Bus (or "USB") or fiber optic cable, or standard wireless protocols, such as Bluetooth® or any Wireless Fidelity (or "Wi-Fi") protocol, such as over the network 980 or directly.

The environmental or operational sensors 920 may include any components or features for determining one or more attributes of an environment in which the aerial vehicle 910 is operating, or may be expected to operate, including extrinsic information or data or intrinsic information or data. As is shown in FIG. 9, the environmental or operational sensors 920 may include, but are not limited to, a Global Positioning System ("GPS") receiver or sensor 921, a compass 922, a speedometer 923, an altimeter 924, a thermometer 925, a barometer 926, a hygrometer 927, a gyroscope 928, and/or a microphone 932. The GPS sensor 921 may be any device, component, system or instrument adapted to receive signals (e.g., trilateration data or information) relating to a position of the aerial vehicle 910 from one or more GPS satellites of a GPS network (not shown). The compass 922 may be any device, component, system, or instrument adapted to determine one or more directions with respect to a frame of reference that is fixed with respect to the surface of the Earth (e.g., a pole thereof). The speedometer 923 may be any device, component, system, or instrument for determining a speed or velocity of the aerial vehicle 910, and may include related components (not shown) such as pitot tubes, accelerometers, or other features for determining speeds, velocities, or accelerations.

The altimeter 924 may be any device, component, system, or instrument for determining an altitude of the aerial vehicle 910, and may include any number of barometers, transmitters, receivers, range finders (e.g., laser or radar) or other features for determining heights. The thermometer 925, the barometer 926 and the hygrometer 927 may be any devices, components, systems, or instruments for determining local air temperatures, atmospheric pressures, or humidities within a vicinity of the aerial vehicle 910. The gyroscope 928 may be any mechanical or electrical device, component, system, or instrument for determining an orientation, e.g., the orientation of the aerial vehicle 910. For example, the gyroscope 928 may be a traditional mechanical gyroscope having at least a pair of gimbals and a flywheel or rotor. Alternatively, the gyroscope 928 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 910. The microphone 932 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy.

The microphone 932 may also be provided as a discrete component, or in combination with one or more other components, e.g., an imaging device, such as a digital camera. Furthermore, the microphone 932 may be configured to detect and record acoustic energy from any and all directions.

Those of ordinary skill in the pertinent arts will recognize that the environmental or operational sensors 920 may include any type or form of device or component for determining an environmental condition within a vicinity of the aerial vehicle 910 in accordance with the present disclosure. For example, the environmental or operational sensors 920 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors 921, 922, 923, 924, 925, 926, 927, 928, 932 shown in FIG. 9.

The data processing system 970 includes one or more physical computer servers 972 having a plurality of data stores 974 associated therewith, as well as one or more computer processors 976 provided for any specific or general purpose. For example, the data processing system 970 of FIG. 9 may be independently provided for the exclusive purpose of receiving, analyzing or storing sounds, propeller shapes, corresponding lifting forces, and/or other information or data received from the aerial vehicle 910 or, alternatively, provided in connection with one or more physical or virtual services configured to receive, analyze or store such sounds, information or data, as well as one or more other functions. The servers 972 may be connected to or otherwise communicate with the data stores 974 and the processors 976. The data stores 974 may store any type of information or data, including but not limited to sound information or data, and/or information or data regarding environmental conditions, operational characteristics, or positions, for any purpose. The servers 972 and/or the computer processors 976 may also connect to or otherwise communicate with the network 980, as indicated by line 978, through the sending and receiving of digital data. For example, the data processing system 970 may include any facilities, stations or locations having the ability or capacity to receive and store information or data, such as media files, in one or more data stores, e.g., media files received from the aerial vehicle 910, or from one another, or from one or more other external computer systems (not shown) via the network 980. In some implementations, the data processing system 970 may be provided in a physical location. In other such implementations, the data processing system 970 may be provided in one or more alternate or virtual locations, e.g., in a "cloud"-based environment. In still other implementations, the data processing system 970 may be provided onboard one or more aerial vehicles, including but not limited to the aerial vehicle 910.

The network 980 may be any wired network, wireless network, or combination thereof, and may comprise the Internet in whole or in part. In addition, the network 980 may be a personal area network, local area network, wide area network, cable network, satellite network, cellular telephone network, or combination thereof. The network 980 may also be a publicly accessible network of linked networks, possibly operated by various distinct parties, such as the Internet. In some implementations, the network 980 may be a private or semi-private network, such as a corporate or university intranet. The network 980 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 910 or the data processing system 970 may use any web-enabled or Internet applications or features, or any other client-server applications or features including E-mail or other messaging techniques, to connect to the network 980, or to communicate with one another, such as through short or multimedia messaging service (SMS or MMS) text messages. For example, the aerial vehicle 910 may be adapted to transmit information or data in the form of synchronous or asynchronous messages to the data processing system 970 or to any other computer device in real time or in near-real time, or in one or more offline processes, via the network 980. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 912 or the processor 976, or any other computers or control systems utilized by the aerial vehicle 910 or the data processing system 970, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or include signals that may be downloaded through the Internet or other networks.

Figure 10:
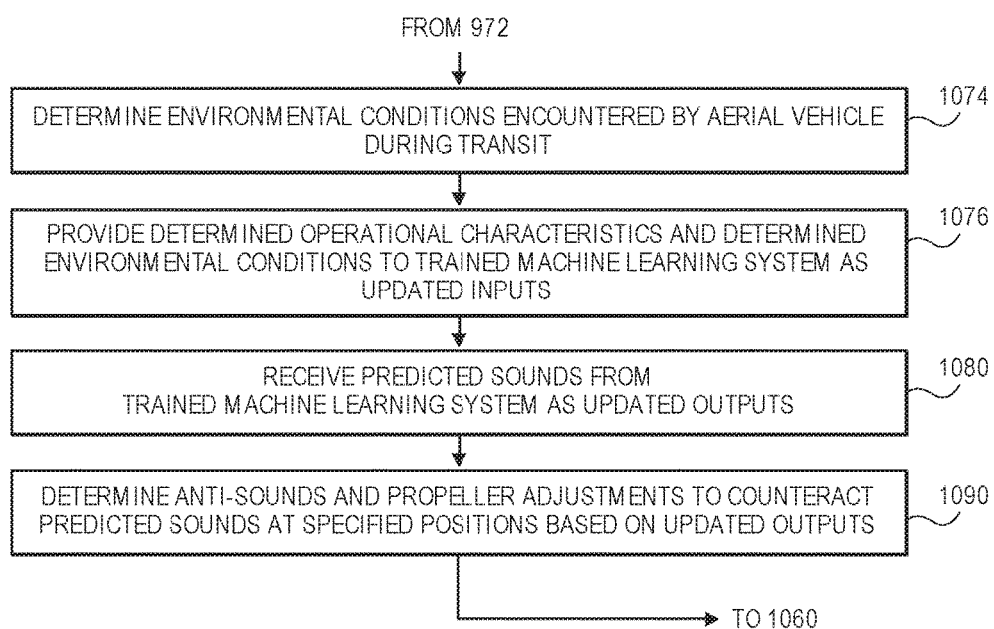
FIG. 10 is a flow diagram illustrating an example process for active airborne sound control, according to an implementation.

FIG. 10 illustrates an example process 1000 for active airborne sound control, according to an implementation. The example process 1000 begins by determining a destination of an aerial vehicle, as in 1010. A transit plan may then be determined for transit of the aerial vehicle from an origin to the destination, as in 1020. For example, the transit plan may specify an estimated time of departure from the origin, locations of any waypoints between the origin and the destination, a desired time of arrival at the destination, or any other relevant geographic or time constraints associated with the transit. Operational characteristics of the aerial vehicle that are required in order to complete the transit from the origin to the destination in accordance with the transit plan, e.g., courses or speeds of the aerial vehicle, and corresponding instructions to be provided to such motors, rotors, rudders, ailerons, flaps or other features of the aerial vehicle in order to achieve such courses or speeds, may be predicted, as in 1022. Environmental conditions expected to be encountered during the transit from the origin to the destination in accordance with the transit plan may also be predicted, as in 1024. For example, weather forecasts for the times or dates of the departure or the arrival of the aerial vehicle, and for the locations of the origin or the destination, may be identified on any basis.

The transit plan identified, the predicted operational characteristics, and the predicted environmental conditions are provided to a trained machine learning system as initial inputs, as in 1026. The machine learning system may utilize one or more algorithms or techniques, such as nearest neighbor methods or analyses, factorization methods or techniques, K-means clustering analyses or techniques, similarity measures, such as log likelihood similarities or cosine similarities, latent Dirichlet allocations or other topic models, or latent semantic analyses, and may be trained to associate environmental, operational or location-based information with sounds at the propellers or other locations on the frame of the aerial vehicle. In some implementations, the trained machine learning system resides and/or operates on one or more computing devices or machines provided onboard the aerial vehicle. In some other implementations, the trained machine learning system resides in one or more alternate or virtual locations, e.g., in a "cloud"-based environment accessible via a network.

The predicted sounds are received from the machine learning system as outputs for each respective propeller adjustment controller located at the propellers or other locations on the frame of the aerial vehicle, as in 1030. Such sounds may be average or general sounds anticipated at each propeller for the entire transit of the aerial vehicle from the origin to the destination in accordance with the transit plan, or may change or vary based on the predicted location of the aerial vehicle, a time between the departure of the aerial vehicle from the origin and an arrival of the aerial vehicle at the destination, and/or based on the position of the sensor on the frame of the aerial vehicle. Alternatively, or additionally, the machine learning system may also determine a confidence interval, a confidence level or another measure or metric of a probability or likelihood that the predicted sound for each propeller adjustment controller will occur in a given environment that is subject to given operational characteristics at a given position.

Based on the predicted sound, anti-sounds intended to counteract the predicted sound at each propeller adjustment controller are determined, as in 1040. Based on the anti-sound, a propeller shape and rotational speed is determined that will generate the anti-sound and satisfy the operational characteristics when the aerial vehicle is within a vicinity of the given location in accordance with the transit plan, as in 1045. In some implementations, the power draw for different propeller shapes that will generate the same lifting force may be considered in determining a propeller shape for use in generating the anti-sound.

The aerial vehicle departs from the origin to the destination, as in 1050, and each propeller adjustment controller of the aerial vehicle adjusts a corresponding propeller to correspond to the determined shape(s) so that the respective anti-sounds at specific positions during the transit from the origin to the destination are generated due to rotation of the propeller and/or opening/closing of sound flaps on the propeller. For example, the aerial vehicle may monitor its position during the transit using one or more GPS receivers or sensors and send instructions or provide position information to each propeller adjustment controller. In response, each propeller adjustment controller will, if instructed, cause the propeller to alter shapes and/or speeds to generate an anti-sound correspond to each position. A determination is then made as to whether the aerial vehicle has arrived at the destination, as in 1070. If the aerial vehicle has arrived at the destination, the example process completes.

If the aerial vehicle has not yet arrived at the destination, however, then the example process 1000 determines the actual operational characteristics of the aerial vehicle during the transit, as in 1072. For example, information or data regarding the actual courses or speeds of the aerial vehicle, and the operational actions, events or instructions that caused the aerial vehicle to achieve such courses or speeds, may be captured and recorded in at least one data store, which may be provided onboard the aerial vehicle, or in one or more alternate or virtual locations, e.g., in a cloud-based environment accessible via a network. Environmental conditions encountered by the aerial vehicle during the transit are also determined, as in 1074. For example, information or data regarding the actual wind velocities, humidity levels, temperatures, precipitation or any other environmental events or statuses within the vicinity of the aerial vehicle may also be captured and recorded in at least one data store.

The information or data regarding the determined operational characteristics and environmental conditions are provided to the trained machine learning system as updated inputs, in real time or in near-real time, as in 1076. In some implementations, values corresponding to the operational characteristics or environmental conditions are provided to the trained machine learning system. In some other implementations, values corresponding to differences or differentials between the determined operational characteristics or the determined environmental conditions and the predicted operational characteristics or the predicted environmental conditions may be provided to the trained machine learning system.

Based on the determined operational characteristics and/or determined environmental conditions, predicted sounds for each sound control are received from the trained machine learning system as updated outputs, as in 1080. As discussed above, sounds predicted to occur at each propeller adjustment controller may be predicted in accordance with a transit plan for the aerial vehicle, and anti-sounds determined based on such predicted sounds may be determined based on the transit plan, as well as any other relevant information or data regarding the transit plan, including attributes of an origin, a destination or any intervening waypoints, such as locations, topography, population densities or other criteria. Anti-sounds for counteracting the predicted sounds received from the trained machine learning system based on the updated outputs are determined before the process returns to box 1060, where the propellers are adjusted or shaped so that the updated anti-sounds are generated by the propellers, as in 1090.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language, such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An apparatus, comprising: a hub that that may be coupled to a motor to facilitate rotation of a propeller; a propeller blade of the propeller extending from the hub, the propeller blade including: a first section having a first end and a second end, the first end coupled to the hub; a joint coupled to the second end of the first section; a second section having a first end and a second end, the first end of the second section coupled to the joint and the second end of the second section extending away from the joint, wherein the second section of the propeller blade is adjustable between a first position with respect to the first section of the propeller blade and a second position with respect to the first section of the propeller blade; and a propeller adjustment controller operable to control the joint, wherein the propeller adjustment controller is configured to at least: determine a lifting force to be produced by the propeller; determine a sound to be produced by the propeller; and cause the joint to adjust the second section of the propeller blade from the first position to the second position such that the propeller will produce the sound when rotating at to produce the lifting force.

2. The apparatus of claim 1, further comprising:
a plurality of sound flaps pivotally connected to the propeller blade, each of the plurality of sound flaps configured to open or close during rotation of the propeller blade, wherein such opening or closing of each of the plurality of sound flaps alters the sound generated during rotation of the propeller.

3. The apparatus of claim 2, further comprising: an actuator positioned adjacent to a first sound flap of the plurality of sound flaps, the actuator configured to cause the first sound flap to open when the actuator is activated and allow the first sound flap to close when the actuator is not activated.

4. The apparatus of claim 2, further comprising:
a servo motor coupled to a first sound flap of the plurality of sound flaps, the servo motor configured to cause the first sound flap to open or close.

5. The apparatus of claim 1, further comprising:
a power source coupled to the propeller adjustment controller and configured to provide power to the propeller adjustment controller.

6. The apparatus of claim 5, wherein the power source is at least one of a solar power source, or a motion based power source.

7. The apparatus of claim 1, wherein the propeller adjustment controller is further configured to at least:
determine a combination of a rotational speed and a propeller shape that will produce the lifting force and the sound.

8. The apparatus of claim 7, wherein:
the combination is determined from a plurality of combinations that will produce the lifting force and the sound; and
the combination is determined from the plurality of combinations as the combination that requires a least amount of power.

9. A propeller, comprising: a hub; a propeller blade extending from the hub, the propeller blade including: a first section coupled to the hub and extending from the hub; a first joint coupled to first section of the propeller blade that is adjustable in at least one of a horizontal direction, a vertical direction, or a rotational direction; a second section of the propeller blade extending from the first joint; and a propeller adjustment controller coupled to the first joint and configured to adjust the second section of the propeller blade from a first position with respect to the first section of the propeller blade to a second position with respect to the first section of the propeller blade, wherein: the propeller adjustment controller includes at least one of a counterweight, a spring, or a cable and causes the first joint to adjust the second section of the propeller blade from the first position to the second position based at least in part on a rotational speed of the propeller blade; and the propeller blade generates a first sound when rotating when the second section of the propeller blade is in the first position and generates a second sound when rotating when the second section of the propeller blade is in the second position.

10. The propeller of claim 9, wherein the second sound is an anti-sound that, when combined with a sound generated by an aerial vehicle to which the propeller is coupled, alters the sound generated by the aerial vehicle.

11. The propeller of claim 9, wherein the propeller adjustment controller is configured to at least:
receive a sound from a sensor positioned on an aerial vehicle to which the propeller is coupled;
determine a second sound such that the second sound, when combined with the sound will alter the sound; and
determine a propeller blade shape that will cause the propeller to generate the second sound when the propeller is rotated, wherein the propeller blade shape corresponds to the second section of the propeller blade being in the second position.

12. The propeller of claim 9, wherein the propeller is coupled to and used to lift an unmanned aerial vehicle when the propeller is rotating.

13. The propeller of claim 9, the propeller blade further including:

a second joint coupled to the second section of the propeller blade that is adjustable in at least one of the horizontal direction, the vertical direction, or the rotational direction; and a third section of the propeller blade extending from the second joint.

14. The propeller of claim 13, wherein the propeller adjustment controller is further coupled to the second joint and configured to adjust the third section of the propeller blade from a third position with respect to the second section of the propeller blade to a fourth position with respect to the second section of the propeller blade, wherein the propeller blade generates:

a third sound when the second section of the propeller blade is in the first position and the third section of the propeller blade is in the third position, a fourth sound when the second section of the propeller blade is in the second position and the third section of the propeller blade is in the third position, a fifth sound when the second section of the propeller blade is in the first position and the third section of the propeller blade is in the fourth position; and a sixth sound when the second section of the propeller blade is in the second position and the third section of the propeller blade is in the fourth position.

15. The propeller of claim 9, the propeller adjustment controller further including: a guide rail extending through an internal portion of the propeller blade, wherein the guide rail is coupled to the first joint and configured to cause the first joint to alter a shape of the propeller blade when the guide rail is moved.

16. The propeller of claim 15, the propeller blade including:

a sound flap configured to move between an open position and a closed position such that a sound generated by a rotation of the propeller is altered based on whether the sound flap is in the open position or the closed position.

17. The propeller of claim 16, wherein the guide rail includes a plurality of protrusions positioned to cause the sound flap to move from the open position to the closed position as the guide rail moves.

18. The propeller of claim 9, wherein: the at least one of the counterweight, the spring, or the cable, cause the first joint to be in the first position when the propeller is rotating at a first speed and cause the first joint to be in the second position when the propeller is rotating at a second speed.

19. The propeller of claim 9, wherein the counterweight moves from a first position to a second position due to a centrifugal force caused by a change in a rotational speed of the propeller blade.

20. A propeller, comprising:

a propeller blade; and a plurality of sound flaps movably coupled to the propeller blade such that a sound generated by a rotation of the propeller blade is altered as each of the plurality of sound flaps move between an open position or a closed position;

wherein:

when a first sound flap of the plurality of sound flaps is in an open position and a second sound flap of the plurality of sound flaps is in a closed position the propeller, when rotating, generates a first sound;

when the first sound flap of the plurality of sound flaps is in the closed position and the second sound flap of the plurality of sound flaps is in the open position the propeller, when rotating, generates a second sound that is distinct from the first sound; and when the first sound flap of the plurality of sound flaps is in the open position and the second sound flap of the plurality of sound flaps is in the open position the propeller, when rotating, generates a third sound that is distinct from the first sound and the second sound.

21. The propeller of claim 20, further comprising:

a motor coupled to the first sound flap and configured to move the first sound flap between the open position and the closed position.

22. The propeller of claim 20, wherein each of the plurality of sound flaps are positioned along a leading edge of the propeller blade.

23. The propeller of claim 20, wherein each of the plurality of sound flaps open and close in a random order as the propeller is rotating.

* * * * *